(12) United States Patent
Cao et al.

(10) Patent No.: US 8,359,216 B2
(45) Date of Patent: Jan. 22, 2013

(54) SYSTEM AND METHOD FOR FINDING BUSINESS TRANSFORMATION OPPORTUNITIES BY USING A MULTI-DIMENSIONAL SHORTFALL ANALYSIS OF AN ENTERPRISE

(75) Inventors: Rong Zeng Cao, Beijing (CN); Wei Ding, Beijing (CN); Shun Jiang, Beijing (CN); Juhnyoung Lee, Yorktown Heights, NY (US); Chun Hua Tian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 12/243,898

(22) Filed: Oct. 1, 2008

(65) Prior Publication Data
US 2010/0082387 A1    Apr. 1, 2010

(51) Int. Cl.
*G06Q 30/00* (2006.01)

(52) U.S. Cl. ................ 705/7; 705/8; 705/9; 705/10

(58) Field of Classification Search ............... 705/7, 8, 705/9, 10
See application file for complete search history.

(56) References Cited

U.S. PATENT DOCUMENTS

| | | | |
|---|---|---|---|
| 5,737,494 A | 4/1998 | Guinta et al. |
| 5,918,232 A | 6/1999 | Pouschine et al. |
| 5,946,694 A | 8/1999 | Copeland et al. |
| 6,011,559 A | 1/2000 | Gangopadhyay et al. |
| 6,023,578 A | 2/2000 | Birsan et al. |
| 6,119,149 A | 9/2000 | Notani |
| 6,161,101 A | 12/2000 | Guinta et al. |
| 6,212,530 B1 | 4/2001 | Kadlec |
| 6,292,830 B1 | 9/2001 | Taylor et al. |
| 6,332,130 B1 | 12/2001 | Notani et al. |
| 6,339,838 B1 | 1/2002 | Weinman, Jr. |
| 6,411,936 B1 | 6/2002 | Sanders |
| 6,556,974 B1 | 4/2003 | D'Alessandro |
| 6,601,233 B1 | 7/2003 | Underwood |
| 6,789,252 B1 | 9/2004 | Burke et al. |
| 6,919,910 B2 | 7/2005 | Chang |
| 6,928,436 B2 | 8/2005 | Baudel |
| 6,954,758 B1 | 10/2005 | O'Flaherty |
| 6,965,868 B1 | 11/2005 | Bednarek |
| 7,117,161 B2 | 10/2006 | Bruce |
| 7,136,827 B2 | 11/2006 | Eicher |
| 7,162,427 B1 | 1/2007 | Myrick et al. |

(Continued)

OTHER PUBLICATIONS

Ernest et al., Adding value to the IT organization with the Component Business Model, IBM Systems Journal, 2007, vol. 46, No. 3.

(Continued)

*Primary Examiner* — Nga B. Nguyen
(74) *Attorney, Agent, or Firm* — Scully, Scott, Murphy & Presser, P.C.; William Stock, Esq.

(57) ABSTRACT

A method and system for determining one or more shortfalls of one or more business components by multiple dimensions for business transformation, in one aspect define a plurality of shortfall types associated with a plurality of business components, define a plurality of dimensions of the plurality of business components, construct a shortfall assessment model for the plurality of dimensions, load a business model associated with the plurality of business components, compute shortfall assessment by performing a daisy chain analysis using the shortfall assessment model and the business model for said plurality of shortfalls and associated shortfall types, and presenting the shortfall assessment using visualization.

35 Claims, 13 Drawing Sheets

U.S. PATENT DOCUMENTS

| | | | |
|---|---|---|---|
| 7,206,751 | B2 | 4/2007 | Hack et al. |
| 7,246,128 | B2 | 7/2007 | Jordahl |
| 7,251,613 | B2 | 7/2007 | Flores et al. |
| 7,283,986 | B2 | 10/2007 | Okunseinde et al. |
| 7,308,414 | B2 | 12/2007 | Parker et al. |
| 7,415,437 | B2 | 8/2008 | Marvin et al. |
| 7,503,032 | B2 | 3/2009 | Bhaskaran et al. |
| 7,506,302 | B2 | 3/2009 | Bahrami et al. |
| 7,574,694 | B2 | 8/2009 | Mangan et al. |
| 7,584,117 | B2 | 9/2009 | Bubner |
| 7,593,012 | B2 | 9/2009 | Ikehata et al. |
| 7,605,813 | B2 | 10/2009 | Uthe |
| 7,617,177 | B2 | 11/2009 | Bukary et al. |
| 7,668,855 | B2 | 2/2010 | Hodgson et al. |
| 7,693,738 | B2 | 4/2010 | Guinta et al. |
| 7,885,841 | B2 | 2/2011 | King |
| 7,925,594 | B2 | 4/2011 | Jaligama et al. |
| 7,933,762 | B2 | 4/2011 | Pinto et al. |
| 2001/0034628 | A1 | 10/2001 | Eder |
| 2001/0049615 | A1 | 12/2001 | Wong et al. |
| 2002/0099563 | A1 | 7/2002 | Adendorff et al. |
| 2003/0004746 | A1 | 1/2003 | Kheirolomoom et al. |
| 2003/0120372 | A1 | 6/2003 | Ruth et al. |
| 2004/0059611 | A1 | 3/2004 | Kananghinis et al. |
| 2004/0064436 | A1 | 4/2004 | Breslin et al. |
| 2004/0078378 | A1 | 4/2004 | Bala |
| 2004/0078777 | A1 | 4/2004 | Bahrami |
| 2004/0143470 | A1 | 7/2004 | Myrick et al. |
| 2005/0065831 | A1 | 3/2005 | Keay et al. |
| 2005/0119922 | A1 | 6/2005 | Eder |
| 2005/0154769 | A1 | 7/2005 | Eckart et al. |
| 2005/0171980 | A1 | 8/2005 | Fernandez et al. |
| 2005/0203784 | A1 | 9/2005 | Rackham |
| 2005/0246215 | A1 | 11/2005 | Rackham |
| 2006/0015424 | A1 | 1/2006 | Esposito et al. |
| 2006/0100947 | A1 | 5/2006 | Cimral et al. |
| 2006/0129419 | A1 | 6/2006 | Flaxer et al. |
| 2006/0178920 | A1 | 8/2006 | Muell |
| 2006/0184412 | A1 | 8/2006 | Kagan et al. |
| 2006/0190544 | A1 | 8/2006 | Chikirivao et al. |
| 2006/0195373 | A1 | 8/2006 | Flaxer et al. |
| 2006/0229926 | A1 | 10/2006 | Homann et al. |
| 2006/0241956 | A1 | 10/2006 | Levy et al. |
| 2007/0021993 | A1 | 1/2007 | Chandra et al. |
| 2007/0022410 | A1 | 1/2007 | Ban et al. |
| 2007/0027701 | A1 | 2/2007 | Cohn et al. |
| 2007/0033211 | A1 | 2/2007 | Berman et al. |
| 2007/0038465 | A1 | 2/2007 | Jang et al. |
| 2007/0038501 | A1 | 2/2007 | Lee et al. |
| 2007/0038502 | A1 | 2/2007 | Kagan et al. |
| 2007/0038627 | A1 | 2/2007 | Cohn et al. |
| 2007/0050232 | A1 | 3/2007 | Chang et al. |
| 2007/0106520 | A1 | 5/2007 | Akkiraju et al. |
| 2007/0118551 | A1 | 5/2007 | Akkiraju et al. |
| 2007/0136115 | A1 | 6/2007 | Doganaksoy et al. |
| 2007/0162482 | A1 | 7/2007 | Flaxer et al. |
| 2007/0174109 | A1 | 7/2007 | Cohn et al. |
| 2007/0179822 | A1 | 8/2007 | Benayon et al. |
| 2007/0179825 | A1 | 8/2007 | Dreiling et al. |
| 2007/0203766 | A1 | 8/2007 | Adler et al. |
| 2007/0214025 | A1* | 9/2007 | Jang et al. .......................... 705/7 |
| 2007/0245297 | A1 | 10/2007 | Kuester et al. |
| 2007/0250373 | A1 | 10/2007 | Ernest et al. |
| 2007/0265864 | A1 | 11/2007 | Chess et al. |
| 2007/0271277 | A1 | 11/2007 | Ivan et al. |
| 2007/0279416 | A1 | 12/2007 | Cobb et al. |
| 2008/0004924 | A1 | 1/2008 | Cao et al. |
| 2008/0033888 | A1 | 2/2008 | Flaxer et al. |
| 2008/0172273 | A1* | 7/2008 | Rackham .......................... 705/7 |
| 2008/0177622 | A1* | 7/2008 | Akkiraju et al. ................ 705/10 |
| 2008/0313596 | A1* | 12/2008 | Kreamer et al. .............. 717/101 |
| 2009/0006150 | A1 | 1/2009 | Prigge et al. |

OTHER PUBLICATIONS

Lee et al., Value-Centric, Model-Driven Business Transformation, CEC-EEE '06 Proceedings of the 8th IEEE International Conference on E-Commerce Technology and the 3rd International Conference on Enterprise Computing, E-Commerce and E-Services, IEEE Computer Society Washington DC, ISBN 0-7695-2511-3.

Li et al., Continual Business Transformation Technology, International Federation for Information Processing, vol. 205, Research and Practical Issues of Enterprise Information Systems, eds. Tjoa, A.M., Xu, L., Chaudhry, S., (Boston: Springer), pp. 85-95.

Office Action dated Jun. 29, 2011 received in related U.S. Appl. No. 12/243,891.

Office Action dated Jul. 19, 2011 received in related U.S. Appl. No. 12/243,851.

Office Action dated Jul. 5, 2011 received in related U.S. Appl. No. 12/243,811.

Office Action dated May 20, 2011 received in related U.S. Appl. No. 12/243,872.

Microsoft Office Project Server 2007, 2006 Microsoft Corporation, http://download.microsoft.com/download/e/b/9/eb9e67aa-ae8c-4cc4-aad8-9e352f92c28c/ProjectPortfolioServer2007ProductGuide.doc.

Microsoft Office Project Portfolio Server 2007 Optimizer, https://www.am.ohio.gov/PortfolioServer/Manuals/MOPPS-Optimizer.pdf.

Balzer et al., Voroni Treemaps for the Visualization of Software Metrics, Association for Computing Machinery Inc., 2005.

Bederson et al., Ordered and Quantum Treemaps Making Effective use of 2D Space to Display Hierarchies, Institute of Advanced Computer Studies, College Park, MD, ACM, 2002.

Bladh, Step Tree, A File System Visualizer, Thesis No. MSC-2002-3, Department of Software Engineering and Computer Science, Blekinge Institute of Technology, Sweden, 2002.

Hodgson, Squarified Treemaps in XAML and C sing Microsoft Longhorne, the Code Project, 2002.

Heat Map, http://en.wikipedia.org/wiki/Heat_map.

Pentapalli, A Comparative Study of Roth-Erev and Modified Roth-Erev Reinforcement Learning Algorithms for Uniform-Price Double Actions, Iowa State University, 2008.

Brown et al., Treemap 97, 1997, Retrieved from http://otal.umd.edu/Olive/Class/Trees.

Cable et al., Project Portfolio Earned Value Management Using Treemaps, Project Management Institute Research Conference, Jul. 2004.

Johnson et al., Tree-Maps a Space-Filling Approach to the Visualization of Hierarchical Information Structures, IEEE CH3046-09100000284, 1991.

Jungmeister et al., Adapting Treemaps to Stock Portfolio Visualization, University of Maryland, Institute for System Research, Nov. 1992.

North et al., Snap-Together Visualization—Coordinating Multiple Views to Explore Information, HCIL Technical Report 99-10, May 1999.

Shneiderman, Discovering Business Intelligence Using Treemap Visualizations, Beyey Network, Apr. 2006.

Shneiderman, Tree Visualization with Tree-Maps—A 2-D Space-Filling Approach, University of Maryland, 1991.

Songer, Multidimensional Visualization of Project Control Data, Construction Innovation, 4, 173-190, 2004.

Office Action dated Oct. 11, 2011 received in related U.S. Appl. No. 12/243,872.

Carter, E. et al., "Visual Studio Tools for Office: Using Visual Basic 2005 with Excel, Word, Outlook, and Info Path", Addison Wesley Professional, Apr. 26, 2006.

U.S. Office Action mailed Jun. 27, 2012 in related U.S. Appl. No. 12/164,582.

Merino et al., Task-at-hand interface for change detection in stock market data, ACM, 1-59593-353-0-06-005, AVI 06, Venezia, Italy, May 23-26, 2006.

Chintalapani et al., Extending the Utility of Treemaps with Flexible Hierarchy, Archives-org, 2005.

Shneiderman, Treemaps for space-constrained visualization of hierarchies, archives-org, Mar. 21, 2007.

U.S. Official Action mailed Mar. 13, 2012 in related U.S. Appl. No. 12/243,872.

U.S. Official Action mailed Dec. 22, 2011 in related U.S. Appl. No. 12/243,811.

* cited by examiner

Edit Model Mapping

Instruction

This editor allows you to create and modify association of entries in the models you created in the previous step, the association you create in this editor is used to analyze and infer both direct and indirect relationship among various models. It is called "Daisy-Chain Analysis." Please select a source model in the pull-down list. Please note that the only option for the target model is the Business Process model, because it is at the center of the model network. Also, please note that the Business Process model is not available in the source model list, because association is a bidirectional relationship. Once the selected

Source Model:

Value Driver

- Profit
  - Costs
    - Costs of goods sold
    - Human capital management
    - IT costs
    - Product marketing & sales
    - Sales, general & administrative costs (SG&A)
    - Financial management cost
      - Accounts payable and expense reimbursement cost
        - Cost of expense reimbursement
          - Total cost of the process "process expense reimbursements" per expense
          - Total cost of the process "process expense reimbursements" per one thou
          - Total cost of the process "process expense reimbursements" per one thou
          - Total cost of the process "process expense reimbursements" per one thou
          - Total cost of the process "process expense reimbursements" per T&E disb
        - Total cost of AP
          - Total cost of the process "process accounts payable" per disbursement/pa
          - Total cost of the process "process accounts payable" per invoice line item
          - Total cost of the process "process accounts payable" per invoice processe
          - Total cost of the process "process accounts payable" per invoice disburse
          - Total cost of the process "process accounts payable" per one thousand U
          - Total cost of the process "process accounts payable" per one thousand U
          - Total cost of the process "process accounts payable" per one thousand U
    - Fixes asset management cost
      - Capital accounting cost
        - Total cost of the process "perform project accounting" per approved capit
        - Total cost of the process "perform project accounting" per one thousand U
        - Total cost of the process "perform project accounting" per one thousand U
      - Capital planning cost
        - Total cost of the process "perform capital planning and project approval"

[Expand] [Collapse] — 504

Target Model:

Business Process

- 7.5 Develop and maintain information technology solutions
  - 7.5.5 Maintain IT services and solutions
- 8.0 Manage financial resources
  - 8.1 Perform planning and management accounting
    - 8.1.1 Perform planning/budgeting/forecasting
      - 8.1.1.1 Develop and maintain budget policies and procedures
      - 8.1.1.2 Prepare periodic budgets and plans
      - 8.1.1.3 Prepare periodic forecasts
    - 8.1.2 Perform cost accounting and control
      - 8.1.2.1 Perform inventory accounting
      - 8.1.2.2 Perform cost of sales analysis
      - 8.1.2.3 Perform product costing
      - 8.1.2.4 Perform variance analysis
      - 8.1.2.5 Report on profitability
    - 8.1.3 Perform cost management
      - 8.1.3.1 Determine key cost drivers
      - 8.1.3.2 Measure cost drivers
      - 8.1.3.3 Determine critical activities
      - 8.1.3.4 Manage asset resource deployment and utilization
    - 8.1.4 Evaluate and manage financial performance
      - 8.1.4.1 Assess customer and product profitability
      - 8.1.4.2 Evaluate new products
      - 8.1.4.3 Perform life cycle costing
      - 8.1.4.4 Optimize customer and product mix
      - 8.1.4.5 Track performance of new customer and product strategies
      - 8.1.4.6 Prepare activity-based performance measures
      - 8.1.4.7 Manage continuous cost improvement
  - 8.2 Perform revenue accounting
    - 8.2.1 Process customer credit
      - 8.2.1.1 Establish credit policies

[OK] [Cancel] — 502

FIG. 5

| Assessment criteria | | | Score | | | | |
|---|---|---|---|---|---|---|---|
| Criteria | Weight | Description | Very Low ○ | Low ◔ | Moderate ◑ | High ◕ | Very High ● |
| | | | | | | | |
| | | | | | | | |
| | | | | | | | |
| | | | | | | | |
| Total | 100% | | | | | | |

FIG. 12

SYSTEM AND METHOD FOR FINDING BUSINESS TRANSFORMATION OPPORTUNITIES BY USING A MULTI-DIMENSIONAL SHORTFALL ANALYSIS OF AN ENTERPRISE

CROSS-REFERENCE TO RELATED APPLICATIONS

This application is related to U.S. patent application Ser. No. 12/243,811 entitled, "SYSTEM AND METHOD FOR FINANCIAL TRANSFORMATION," U.S. patent application Ser. No. 12/243,851 entitled, "SYSTEM AND METHOD FOR INFERRING AND VISUALIZING CORRELATIONS OF DIFFERENT BUSINESS ASPECTS FOR BUSINESS TRANSFORMATION," U.S. patent application Ser. No. 12/243,872 entitled, "SYSTEM AND METHOD FOR DETERMINING TEMPERATURE OF BUSINESS COMPONENTS FOR FINDING BUSINESS TRANSFORMATION OPPORTUNITIES," U.S. patent application Ser. No. 12/243,891 entitled, "SYSTEM AND METHOD FOR FINDING BUSINESS TRANSFORMATION OPPORTUNITIES BY ANALYZING SERIES OF HEAT MAPS BY DIMENSION," filed on even date and assigned to the same assignee in the present application, contents of which are incorporated by reference herein in their entirety. This application is also related to U.S. patent application Ser. No. 12/164,582 entitled, "SYSTEM AND METHOD FOR PLATFORM-INDEPENDENT, SCRIPT-BASED APPLICATION GENERATION FOR SPREADSHEET SOFTWARE," filed on Jun. 30, 2008 and assigned to the same assignee of the present application, contents of which are incorporated by reference herein in its entirety.

FIELD OF THE INVENTION

The present disclosure relates generally to computer applications, and more particularly to finding business transformation opportunities by using a multi-dimensional shortfall analysis of an enterprise.

BACKGROUND OF THE INVENTION

Business transformation is a key management initiative that attempts to align people, process and technology of an enterprise closely with its business strategy and vision. Business transformation is often achieved by taking a holistic look at various dimensions of an enterprise such as business models, management practices, business processes, organizational structure and technology and optimizing them with best-practice or differentiated methods to reach a strategic end state. For example, business transformation in the enterprise finance area would, among others, optimize financial processes such as accounts receivables, eliminate non-value-added tasks, improve efficiency and productivity of people, and reduce errors by using technologies. Business transformation is considered an essential part of the competitive business cycle.

Consulting service companies in the business transformation area brand technology and consulting as their core product and service offerings. These offerings include models, methods and tools devised for facilitating business transformation. While the state-of-the-art business transformation consulting models and methods are useful, there are a number of general problems that need to be addressed to make them more effective. First, the current approaches are often limited in scalability because they demand subject matter experts to work with a variety of disconnected data, tools, templates and other assets. It is often cumbersome and difficult to streamline the data gathering and management manually. Data and documents often reside in multiple folders distributed among several machines. Consistency checking across data can only be done manually, and the process requires experts. It is not easy to capture a structured thinking process without a tool, which enforces the process or method. Information and knowledge not captured systematically is often difficult to disseminate and reuse effectively. Assets such as knowledge, models and methods are not necessarily managed. For example, more often than not, there is no version control put in place, and updating the assets consistently across the board becomes a daunting task. Multiple views with scattered documents having multiple views such as a process view, metrics view, component view, resource view, etc. are difficult to visualize. This in turn makes it difficult to link up upstream and downstream analysis.

Business transformation is related to earlier efforts and studies in Business Process Reengineering, Business Process Redesign, Business Process Change Management, Business Process Management, and Enterprise Architecture. Business process reengineering (BPR) is a management approach aiming at improvements by means of elevating efficiency and effectiveness of the processes that exist within and across organizations. In BPR, organizations look at their business processes from an unbiased perspective and determine how they can best construct these processes to improve how they conduct business. In 1990s, process reengineering was adopted at an accelerating pace. The early BPR methodologies were rooted in IT-centric BPR solutions. One such model, Process Reengineering Life Cycle approach outlines an iterative application of the following steps: (1) envision new processes, (2) initiating change, (3) process diagnosis, (4) process redesign, (5) reconstruction, and (6) process monitoring. While useful in specific cases, the methodologies did not address issue of scalable applications from the practitioner's viewpoint. There are few tools or information technology that comprehensively facilitates the BPR methodology, and users are left with primitive means for practicing the methodology.

Business Process Management (BPM) is an emerging field of knowledge and research at the intersection between management and information technology, encompassing methods, techniques and tools to design, enact, control, and analyze operational business processes involving humans, organizations, applications, documents and other sources of information. BPM differs from BPR in that it does not aim at one-off revolutionary changes to business processes, but at their continuous evolution. In addition, BPM usually combines management methods with information technology to make business transformation activities faster and cheaper. BPM systems monitor the execution of the business processes so that managers can analyze and change processes in response to data, rather than just a hunch. BPM allows the organizations to manage their processes as any other assets and improve and manage them over the period of time. The activities which constitute BPM life-cycle can be grouped into five categories: Process Design, Process Modeling, Process Execution, Process Monitoring, and Process Optimization.

Another related concept is Enterprise Architecture, which is the description of the current and future structure and behavior of an organization's processes, information systems, personnel and organizational sub-units, aligned with the organization's core goals and strategic direction.

Although often associated strictly with information technology, it relates more broadly to the practice of business optimization in that it addresses business architecture, performance management, organizational structure and process architecture as well. The primary purpose of creating enterprise architecture is to ensure that business strategy and IT investments are aligned. As such, enterprise architecture allows traceability from the business strategy down to the underlying technology. The practice of enterprise architecture involves developing an architecture framework to describe a series of "current", "intermediate" and "target" reference architectures and applying them to align change within the enterprise. These frameworks detail all relevant structure within the organization including business, applications, technology and data Each framework will provide a rigorous taxonomy and ontology that clearly identifies what processes a business performs and detailed information about how those processes are executed. While enterprise architecture is a key component of the information technology governance process at any organization of significant size, it also ideally relates broadly to the practice of business process management and optimization, because it addresses business architecture, performance management and process architecture as well.

U.S. Patent Publication 2005/0246215A1 discloses a system and method for alignment of an enterprise to component business model (CBM). This patent publication discloses creating a component business model of the enterprise in its current state and a component business model of a desired state, then comparing the two to identify the areas of improvement and change. The differences identified between the two are prioritized for alignment with business objectives.

U.S. Patent Publication 2007/0027701 discloses a system and method for using component business model to organize an enterprise. This patent publication discloses how a component business model can be used to organize an enterprise. It describes identifying non-overlapping components of a business and then distinguishing them based on whether each component helps differentiate the business in the marketplace or if it provided standardized functions. One can analyze the attributes of each component and mark components as 'hot', meaning they might need to be optimized to align to the business objectives.

U.S. Patent Publication 2007/0174109 discloses a system and method for transforming an enterprise using a component business model. This patent publication describes a system and a method of using a CBM map for transforming an enterprise. Specifically, it discloses that industry standard CBM maps can be prepared ahead of time for each industry and that these can be retrieved from a repository and customized for each client's need. Components in a CBM can be rearranged based on the transformation strategy chosen. Special views can be enabled on a CBM map to query and focus on specific components related to a specific capability.

U.S. Patent Publication 2008/0033888 discloses a method and system for enterprise portfolio management based on component business model. This patent publication describes managing a portfolio of enterprise IT applications based on component business model. The idea is to help select a suitable set of IT transformation projects from among a larger set of IT transformation projects by conducting value analysis. This value analysis keeps the existing IT infrastructure of the client into account.

The above described patent publications, however, do not disclose or suggest identification of business transformation initiatives automatically, conducting a business case analysis of the transformation initiatives identified via component business modeling analysis, for instance, including return on investment (ROI) calculation, net present value (NPV) calculation, break-even analysis, internal rate of return (IRR), etc. Those publications also do not disclose or suggest, pre-populating the tool with various industry specific content (such as metrics, costs of transformations etc) based on past history, or providing what-if scenario analysis for evaluating several transformation initiatives, thereby facilitating the selection of best suited set of transformations from a portfolio of transformation choices possible. They also do not disclose or suggest automation of health measurement of each component by comparing the metrics associated with a component with those of industry benchmarks.

BRIEF SUMMARY OF THE INVENTION

A method and system for determining one or more shortfalls of one or more business components by multiple dimensions for business transformation are provided. The method, in one aspect, may comprise defining a plurality of shortfall types associated with a plurality of business components and defining a plurality of dimensions of the plurality of business components. The method may also comprise constructing a shortfall assessment model for the plurality of dimensions and loading a business model associated with the plurality of business components. The method may further comprise computing shortfall assessment by performing a daisy chain analysis using the shortfall assessment model and the business model for said plurality of shortfalls and associated shortfall types. The method may yet still comprise presenting the shortfall assessment using visualization.

A system for determining one or more shortfalls of one or more business components by multiple dimensions for business transformation, in one aspect, may comprise a shortfall assessor module operable to define a plurality of shortfall types associated with a plurality of business components, the shortfall assessor module further operable to define a plurality of dimensions of the plurality of business components. The shortfall assessor module may also be operable to load a business model associated with the plurality of business components. An assessment modeler module is operable to construct a shortfall assessment model for the plurality of dimensions. A shortfall creator module is operable to compute shortfall assessment by performing a daisy chain analysis using the shortfall assessment model and a business model for said plurality of shortfalls and associated shortfall types. A shortfall visualization module is operable to present the shortfall assessment using visualization.

A program storage device readable by a machine, tangibly embodying a program of instructions executable by the machine to perform above-described methods may be also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 5 shows a model mapping editor in one embodiment of the present disclosure.

FIG. 12 is a diagram illustrating an example of shortfall assessment model in one embodiment of the present disclosure.

DETAILED DESCRIPTION

The following terms are used in the present disclosure and explained below.

Business process: A business process is a flow of one or more business activities. A business process when executed accomplishes a specific business objective. For example, 'Process accounts payable and expense reimbursements' is a typical business process in the finance management domain.

Business activity: A business activity is the lowest level task in a business process. For example 'Accounts Payable' business process contains activities such as: 'Approve Payments', 'Process taxes', 'Retain records,' etc.

A business component: A business component is an abstract business element. It is a collection of similar and related business activities from various business processes. From this point of view, business processes can be thought of as flows of activities between and within components. A component is defined by a set of people, processes and technology needed by its business function. For example, 'Accounts Payable Processing' is a business component, and the 'Process accounts payable and expense reimbursements' business process may contain activities involved in the 'Accounts Payable Processing' component. A business component enables business processes.

Figure 2:
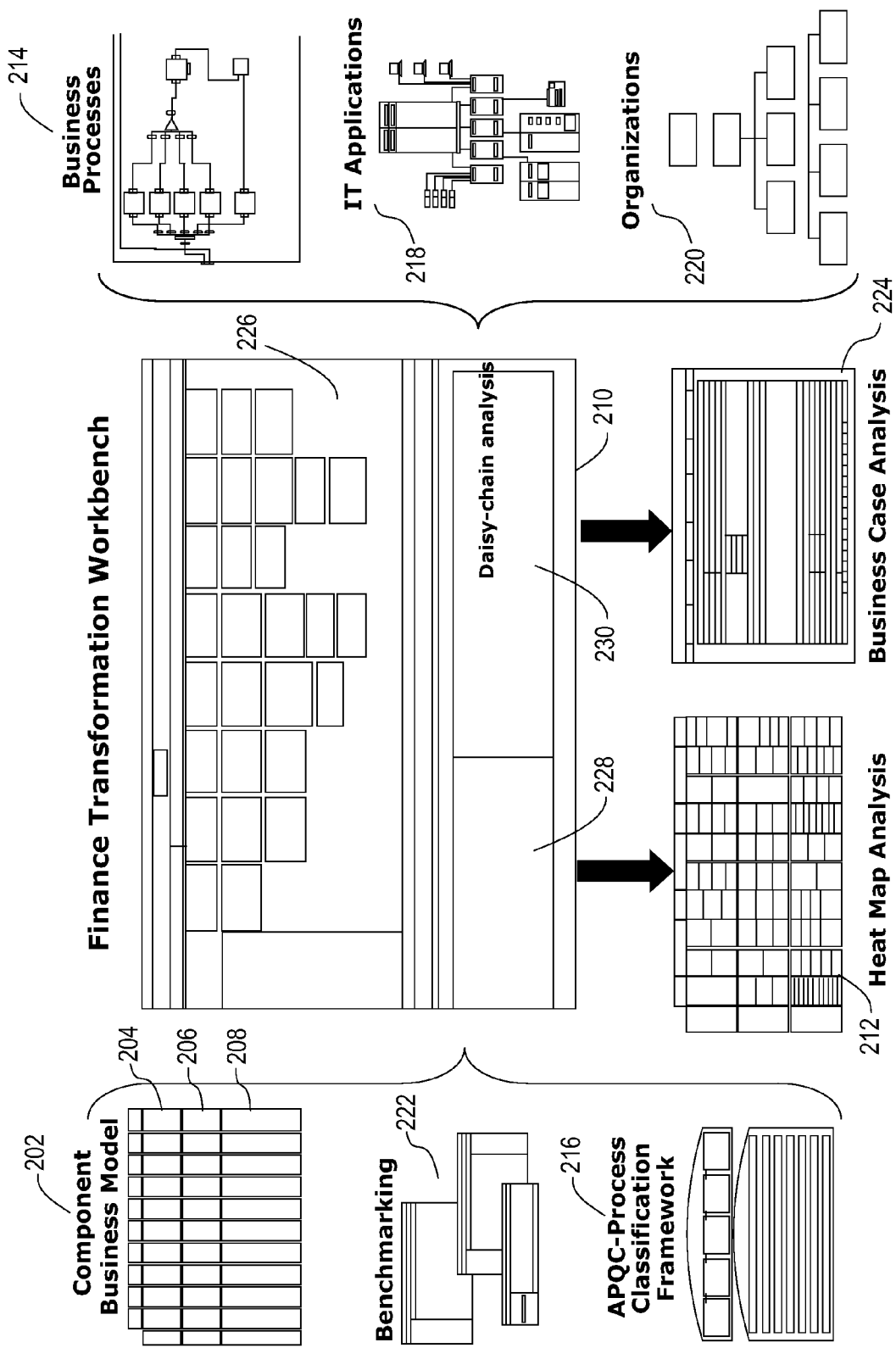
FIG. 2 is an overview of a business transformation (BT) tool environment in one embodiment of the present disclosure.

Component Business Model (CBM): Component business model is a method developed by IBM™ to help analyze clients' business from multiple perspectives such as people, process and technology. The intersection of these views offer improved insights for decision-making. A CBM is a component view of a business where all the similar business activities of a given company's business processes are grouped into components. A sample component business map of a fictitious company is shown in FIG. 2 at 202. It is represented as a two dimensional matrix: The columns are created after analyzing a business's functions, competencies, and value chain. The rows are defined by actions and their accountability levels. The top row, "direct," represents all those components in the business that set the overall strategy and direction for the organization. The middle row, "control," represents all the components that translate those plans into actions, in addition to managing the day-to-day operation of those activities. The bottom row, "execute," contains the business components that actually execute the detailed activities and plans of an organization. The "Component Business Map" shows activities across lines of business, without the constrictions of geographies, internal silos or business units. The component business map for a company is typically represented on a single page. Maps of companies in an industry sector may be similar, but those of different industries may be drastically different.

A system and method of the present disclosure in one embodiment support shortfall assessment for resources, assets such as human and physical assets, and project initiatives. Shortfall refers to deficiency or lack in areas of business such as business processes, IT, and organizations. Shortfall categories for resources and/or assets may include but are not limited to human resource and/or assets, organizations, human skill, budget, equipment, buildings—HP and CDL, data and information, IP assets, business partners such as suppliers and distributors, competitors, geographical locations for outsourcing, project initiatives, etc. Shortfalls also may be categorized by gap in human and/or organization resources, duplication in human and/or organization resources, deficiency in human and/or organization resources, and over-extension in human and/or organization resources.

Multi-dimensional shortfall analysis of the present disclosure allows for determining shortfalls by multiple dimensions, resources, project initiatives, as well as IT infrastructure or applications and organizations. Shortfalls of different dimensions may be rendered in a single view and/or filtered by one or more dimensions. Shortfalls on a component of different dimensions may be aggregated into a single shortfall.

In another aspect, quantitative measures may be augmented with shortfalls. For example, quantitative measures may be used to indicate intensity of shortfalls in terms of one or more metrics such as finance metric (revenue, profit, etc.). Qualitative annotations may be added to explain the reasoning, and color-coding and visualization may be used to help understanding of combined qualitative and quantitative measures of shortfalls. The system and method of the present may also automate shortfall assessment as a visual query. For instance, algorithms may be provided to automatically identify the shortfalls, to categorize and aggregate the identified shortfalls. For example, an algorithm may automatically discover an IT (or organizational) "gap" if a business component is not associated with any IT system (or organizational department). In another example, an algorithm may automatically discover an IT (or organizational) "deficiency" if a business component is associated with one or more IT systems (or organizational departments) and the performance of the business component lag behind a certain level such as a benchmark performance. In this case, the enterprise may want to replace the IT systems (or organizational departments) with better performing ones. In yet another example, an algorithm may automatically discover an IT (or organizational) "duplication" if a business component is associated with more than one IT systems (or organizational departments). In this case, the enterprise may want to consolidate the IT systems (or organizational departments) to reduce overhead cost in communication and maintenance of the IT systems (or organizational departments). There may be many other qualitative factors that may be used to determine the types of shortfalls, and the algorithms of the present disclosure for automating shortfall discovery may be used further for a guidance purpose.

Figure 6:
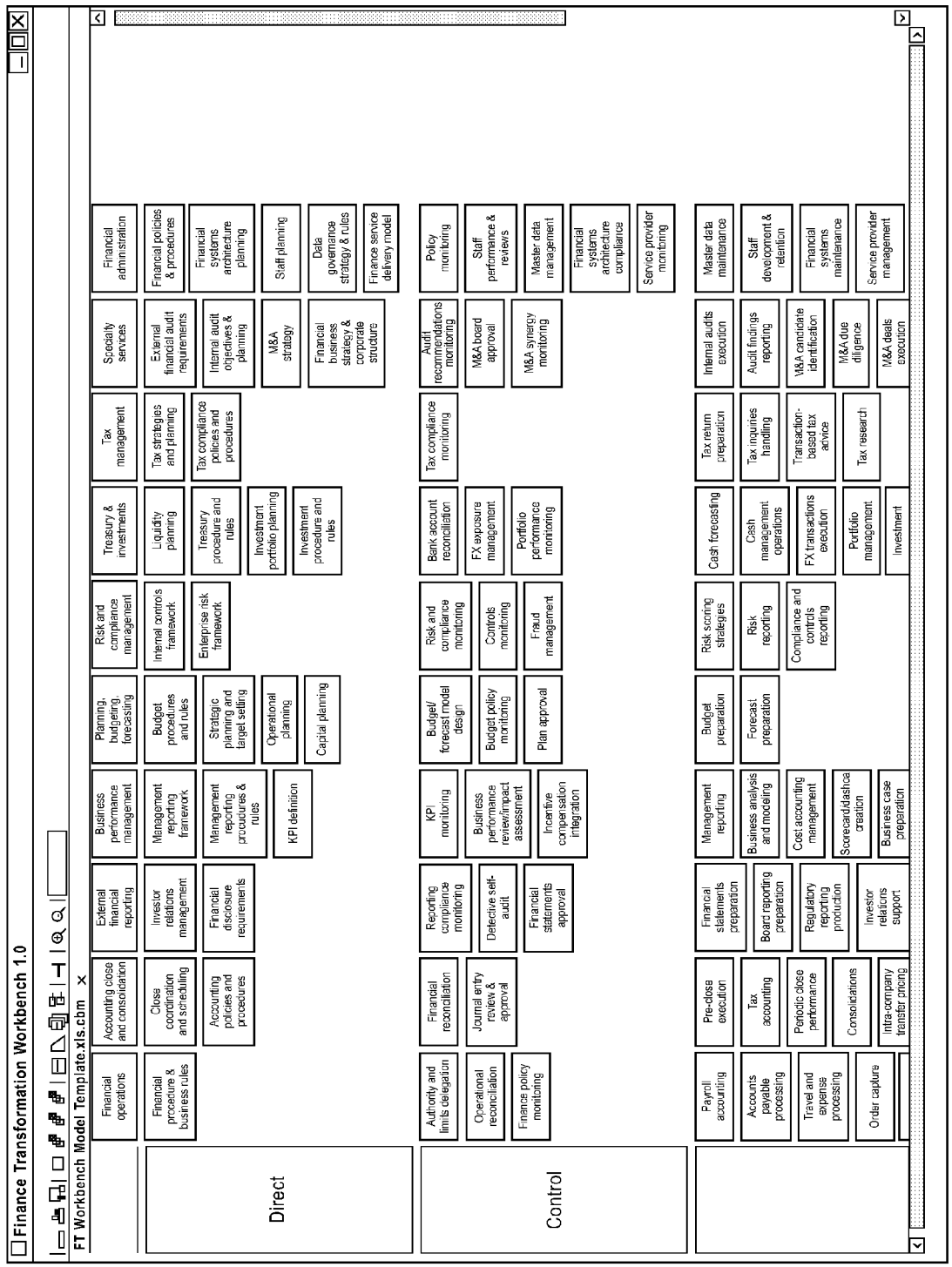
FIG. 6 illustrates a component business model rendered in BT tool of the present disclosure in one embodiment.

FIG. 2 is an overview of a business transformation (BT) tool environment in one embodiment of the present disclosure. In this disclosure, Financial Transformation (FT) is also referred to as Business Transformation (BT). BT tool of the present disclosure provides an integrated view of various business models and data, for example, including component business models 202, a business process model such as APQC (American Product Quality Council) Process Classification Framework (PCF) 216 and SAP Business Process Hierarchy (BPH), a value driver model, an IT infrastructure map 218, an organization structure map 220, and a solution catalog, with the models linked each other. Another example of component business model (202) is shown in fuller view in FIG. 6. A business transformation (BT) tool environment in one embodiment of the present disclosure automates traditional component business model-based analyses in the form of visual queries and inference in one embodiment. For example, one can ask questions such as which metrics help measure the performance of a given business component? What are the IT systems that support the business functions represented by a business component? Which organizations implement the business functions represented by a business component? Which transformation solutions can address a given shortfall? These questions are answered in the tool via the explicit and the inferred linkages made among different models such as the component model 202, IT system model 218, organizational model 220, metrics model 222, business processes model 214, etc. This is also referred to as daisy chain analysis in the tool.

The BT tool of the present disclosure automates the component performance analysis by comparing the metrics that help measure the performance of a component with benchmark data 222. This is referred to as "heat map" analysis in the tool. An example view of a heat map is shown at 212. The underperforming components can be marked as shortfalls based on whether it is caused by a misaligned IT system or by an organization. This identification and marking of shortfalls is referred to as "shortfall assessment" in the tool. The tool provides business benefit analyses in terms of value drivers and standard financial metrics for business case analysis 224 such as NPV (Net Present value), IRR (Internal Return Rate), ROI (Return on Investment), and payback time. The BT tool provides normative and constructive business performance analysis models, so it can be easily configured for different types of clients, initiatives, and projects.

In one embodiment, BT tool may provide views of enterprise CBM maps 226, value drivers 228, and business activities 230 and provides navigation through all of them. It enables analysts to navigate the views and identify dependencies and causal relationships among value drivers 228 and business activities 230 and components 226. It also enables analysts to pinpoint business activities and value drivers supported and improved by solutions and services. It provides detailed value driver reports with charting generated by advanced value modeling. Also, it provides detailed financial analysis reports with charting generated by advanced value modeling.

BT tool of the present disclosure may comprise a Model Template, which may be an Excel™ file providing a template for data preparation and storage for analyses; Transformation Analyzer, which may be a Windows™ application where the user can explore various model views, conduct CBM-based analyses, and identify transformation initiatives for proposal; and Business Case Calculator, which may be an Excel™-based tool where the user can perform business case analysis for the initiatives identified in the Transformation Analysis. These three components may be seamlessly connected to each, and so the user can move back and forth among the components in a straightforward manner. Details of various functionalities of the BT tool are described below.

Model Template

To run business transformation analyses in the system, a set of models and content are prepared following a set of rules. The content preparation can be done by using the provided Model Template, which may be an MS Excel™ file or another spreadsheet application or like, with formatting for the content. The content preparation may include preparing the base models, for example, the six base models. The six base models, for instance, include models for Business Component, Business Process, Value Drivers, Applications, Organizations, and Solutions. The content preparation also includes linking or mapping these base models. Model mapping is described in further detail below.

In one embodiment of the BT tool, content for the base models (e.g., the six base models) are provided in six separate worksheets in the Model Template: one model in each worksheet—Business Component, Business Process, Value Drivers, Applications, Organizations, and Solutions. The BT tool may include a set of sample content for each of the base models (e.g., the model templates populated with initial or default data), for example, derived from available benchmark data, such as APQC, IBM Benchmarking data, and solution and service offering catalogs. Data entries such as metric may have a set of attributes, which may be used in various analyses.

In one embodiment, the Business Component worksheet provides a tabular representation of a CBM map. Business components are grouped by their competencies and each component has its accountability level, i.e., direct, control or execute, as an attribute.

The Business Process worksheet in one embodiment provides a hierarchical representation of a business process structure, e.g., APQC PCF (Process Classification Framework), SAP BPH (Business Process Hierarchy), or IBM EPF (Enterprise Process Framework).

The Value Driver worksheet in one embodiment provides a hierarchical representation of Key Performance Indicators (KPI) of business processes. At the lowest level, it provides business metrics, which are used to measure the performance of low level business activities of the Business Process Hierarchy. The Value Driver worksheet may be pre-populated with one or more attribute values such as one or more benchmark values and the business' current value. The low level metrics are grouped into one or more higher level indicators. At the highest level of the Value Driver tree, the indicators are grouped into financial metrics of enterprises such as cost, revenue, profit, share value, etc.

The Applications worksheet in one embodiment provides a hierarchical representation of the IT infrastructure and applications the enterprise or entity is currently deploying. This information is used in one embodiment of the method and system of the present disclosure to understand where the enterprise stands, and identify any shortfalls in terms of IT.

The Organizations worksheet provides a hierarchical representation of the human resources and organizations the enterprise currently employs. This information is used in one embodiment of the method and system of the present disclosure to understand where the enterprise stands, and identify any shortfalls in terms of human resources and capital.

The Solutions worksheet provides a hierarchical representation of solutions that may address identified shortfalls in business process, IT, data, and human organization. The solution may be software, services and their combinations. A solution does not have to be complete when offered. Instead, it may be composed and designed on demand to address a specific shortfall that is identified.

Figure 3:
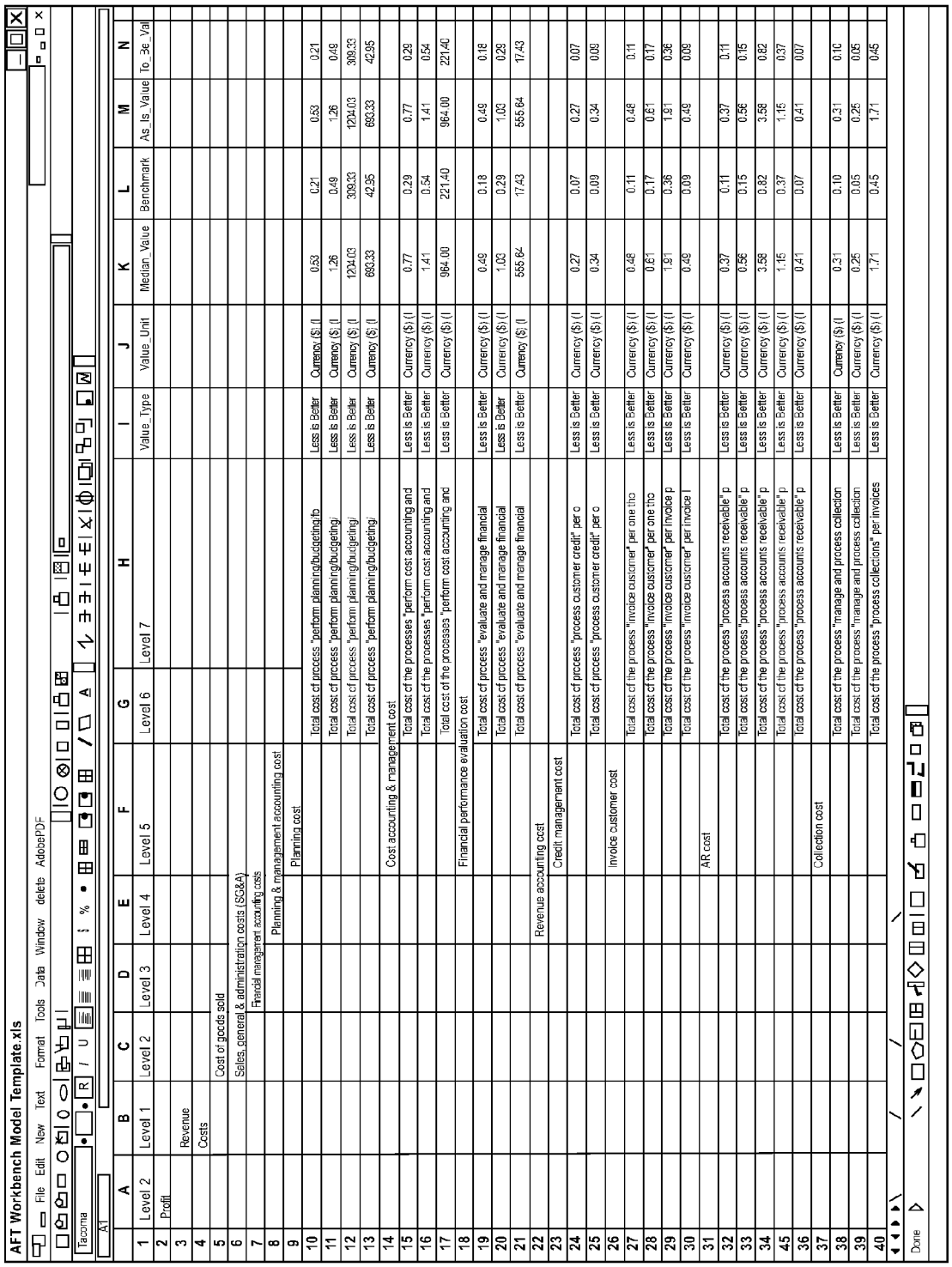
FIG. 3 is an example of a model template provided in the present disclosure in one embodiment.

In one embodiment each model includes data structured in a tree format or view. FIG. 3 shows an example of the value driver tree in the Model Template with metrics attributes such as value type (column I), value unit (column J), benchmark value (column L), median value (column K), as-is value (column M) and to-be value (column N). The as-is value is the current value of the particular metric of the current business, i.e., where the business stands. The to-be value is the target value of the metric the business wants to achieve by applying one or more solutions, i.e., where the business wants to go. The benchmark and median values are reference values. They are compared with the as-is and target values to understand where the business stands and where the business wants to go in the group of peer enterprises. For example, if the as-is value is worse than the benchmark value, i.e., the best practice value among peer companies, the decision makers will want to improve it to the benchmark value level. That is, the to-be value will be the benchmark value. In one embodiment, the model content is generically in a tree form. As long as the structure is maintained, the user can add, delete and modify instances in the tree. In one aspect, a model worksheet may be named after the model that will be in it.

Model Mapping

In one embodiment of the BT tool of the present disclosure, models are mapped to each other. This linking enables the capability to answer various queries. This linking of models and the ability to query them are also referred to herein as "Daisy-Chain analysis." With binary mapping of models, the system infers correlations across multiple models, which provides qualitative understanding on how models are related. For example, with the daisy-chain analysis, the user can see all the business processes and activities that are associated with a business component. In turn, the user can see all the metrics (along with their values) and value drivers of the selected business processes, and so the user can qualitatively see the overall performance of the component.

Figure 4:
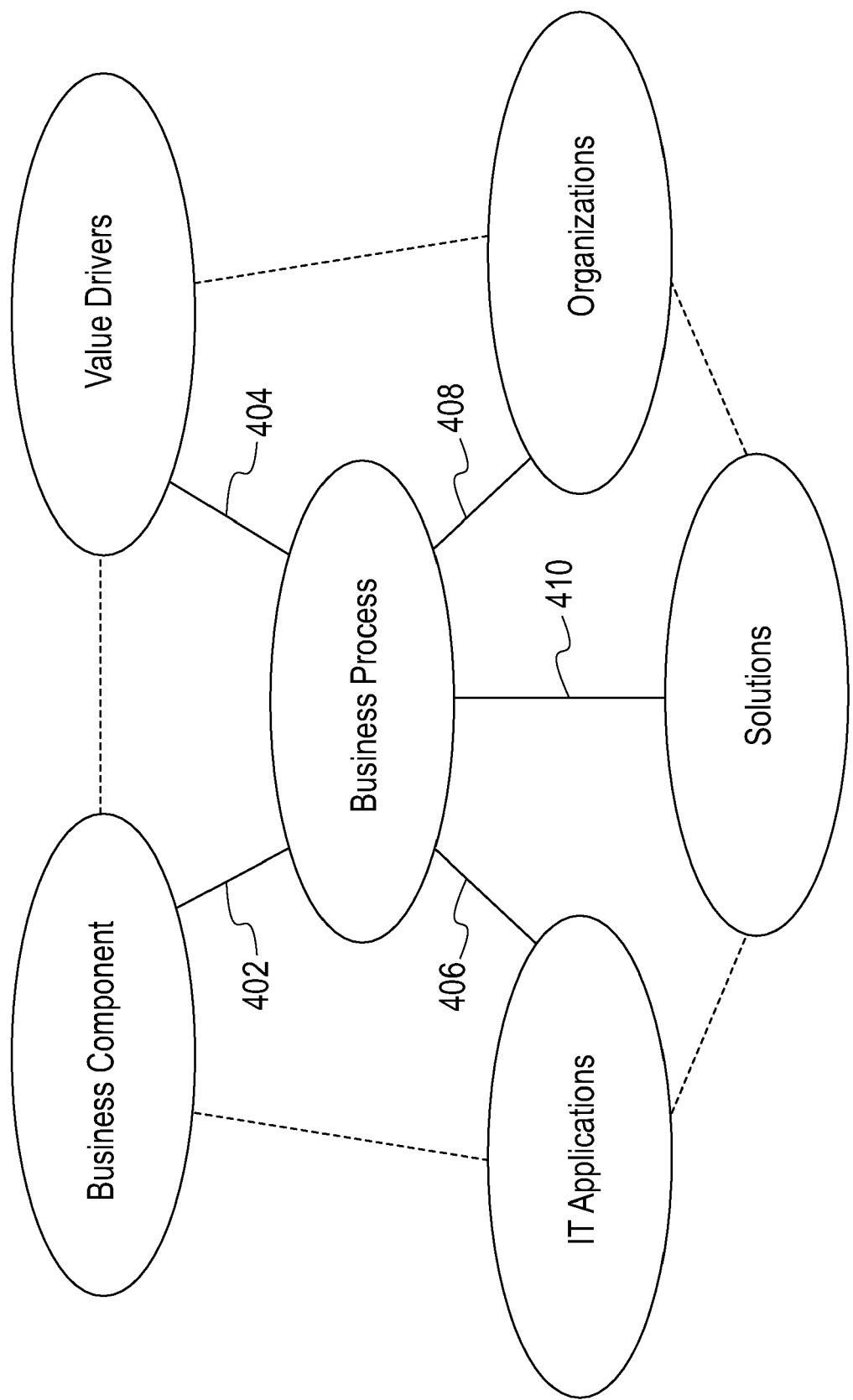
FIG. 4 illustrates a daisy chain model in one embodiment of the present disclosure.

FIG. 4 illustrates daisy chain of models in one embodiment of the present disclosure. For the six base models, the user may provide initial model mapping to Business Processes in the Model Template file, e.g., five types of links, i.e., Comp2BizProc 402, VD2BizProc 404, App2BizProc 406, Org2BizProc 408, and Sol2BizProc 410. In one embodiment, the BT tool uses a hub-and-spoke approach to linking of models, i.e., all models are linked to the business process model instead of each model linking to each other model as shown in FIG. 4. Each model mapping is stored in a separate mapping worksheet bearing the mapping name. The Model Template file provides a set of sample model mapping in the mapping worksheets. For instance, each mapping type has a worksheet. The mapping may be done manually by subject matter experts or business consultants. The mapping is used for the daisy-chain analyses. The explicit mappings stored in the mapping worksheets are used to infer implicit relationships among models in the daisy-chain analyses. The user can add, delete, modify instances in the mapping worksheets by changing entries in the source cell and target cell columns. If the user does not want to create model mapping information at this stage, the user may remove the provided sample data in the mapping worksheets (or worksheets themselves). This model mapping information in this file is optional, and not required to run the tool for analyses.

The BT tool additionally may provide a user interface, e.g., Model Mapping Editor, for creating model mappings. Additional model mapping created with the editor may also be added to the Model Template file, when saved in BT tool. FIG. 5 shows the graphical user interface (GUI) editor for model mapping. It allows the user to select a source model and a target model. On the source side mappings are to be made from the leaf nodes, i.e., nodes with no child nodes. All other nodes of the tree are grayed out. The target model in one embodiment is always the business process model. The model mapping editor also provides tree views of the selected source and target models. In the tree view, the user can map entries in the source and the target models by using check-boxes and buttons. The editor may be implemented using programs such Visual Basic™ or other programming languages.

The BT tool of the present disclosure in one embodiment allows mappings to be made to all levels of the business process tree. FIG. 5 at 502 shows an example of a business process. For example, "8.0 Manage Financial Resources" is a business process. It includes multiple subgroups, i.e., 8.1, 8.2, ..., and multiple levels, i.e., 8.0=>8.1=>8.1.1=>8.1.1.1, as shown in the window 502. Mappings are allowed to be made at all levels of the business process tree mainly to deal with mappings between metrics and business processes. For instance, in FIG. 5, a metric in Value Driver tree 504, e.g., "Total cost of account payable process" can be mapped to a business process at any level of the Business Process tree 502, e.g., 8.0, 8.1, 8.1.1, or 8.1.1.1. Metrics as used herein refer to quantitative measures that indicate the performance of the business process. There may be metrics for all levels of business process. For example, benchmarking wizard tools may have measures and metrics at process level, at process group level. There may be metrics even at the process category level. The Model Mapping Editor allows the user to capture such mappings. In one embodiment, the BT tool does not allow for the same kind of possibility from the source side because opening up the entire tree on both sides could create possibilities for redundant mappings and sometimes even conflicting mappings. To avoid any confusion and redundancy in mappings, the source side opens for mapping only at the leaf node level whereas on the target side mappings are allowed to be made at all levels.

All the mappings in one embodiment of the present disclosure are bi-directional, meaning A is mapped to B, and then B is mapped to A automatically. In order to avoid duplication in mapping, the target model may be fixed to Processes. Every model (source) may be mapped to Process (target). However, Process is not mapped to any model manually. Instead, that part is implied by the first mapping. The mapping or associations made to children get propagated up to the parent but not vice versa in one embodiment. If a component is mapped to a process, it is not assumed that the component implements all activities in that process. For this reason, the BT tool in one embodiment does not propagate process level mappings down to activities.

The prepared content in the Model Template file, for instance, a spreadsheet file such as an Excel™ file is parsed and validated by the BT tool. If the content does not follow the required format set by the rules, a functional module in the BT Workbench such as data validating program, generates error messages to help the user repair the format of content.

Transformation Analyzer

The Transformation Analyzer component of the BT tool in one embodiment provides the following analysis capabilities, although the Transformation Analyzer's functionalities need not be limited to only those listed here: Daisy-Chain Analysis; Business Component Performance Analysis (also referred to as Heat Map Analysis); Shortfall Assessment for both IT application and organization; Solution Analysis; Business Report Generation, for instance, in MS Excel™ and PowerPoint™.

Component Business Modeling described above is a novel business modeling technique from IBM™, which enables users to understand and transform businesses. A component business model represents the entire business in a simple framework that fits on a single page. It is an evolution of traditional views of a business, such as ones through business units, functions, geography, processes or workflow. The component business model methodology helps identify basic building blocks of business, where each building block includes the people, processes and technology needed by this component to act as a standalone entity and deliver value to the organization.

After a comprehensive analysis of the composition of each business, a user can map these individual building blocks, or components, onto a single page of a user interface screen, for example as shown at 226 in FIG. 2. Each component business map may be unique to each company. The columns are created after an analysis of a business's functions and value chain. The rows are defined by actions. FIG. 2 at 202 shows an example of a Component Business Model map rendered in the BT tool. The top row, "direct," 204 shows all of those components in the business that set the overall strategy and direction for the organization. The middle row, "control," 206 represents all of the components in the enterprise, which translate those plans into actions, in addition to managing the day-to-day running of those activities. The bottom row, "execute," 208 contains the business components that actually execute the detailed activities and plans of an organization. The component business map shows activities across lines of business, without the constrictions of geographies, internal silos or business units.

This single page perspective 226 provides a view of the business, which is not constricted by barriers that could potentially hamper the ability to make meaningful business transformation. The component business model facilitates to identify which components of the business create differentiation and value. It also helps identify where the business has capability gaps that need to be addressed, as well as opportunities to improve efficiency and lower costs across the entire enterprise.

The "Daisy-Chain Analysis" is a visual query that allows the user to explore the business maps and understand the correlations and dependencies among business entities. The results of the query are shown in the views 210 of the models in the BT tool highlighting entries in the models that are associated directly and indirectly. For example, this capability can interactively identify one or more business components associated with a particular value driver. Conversely, it can find one or more value drivers that are affected by the performance of a particular business component. The associations between value drivers and business components are discovered through their relationships with business processes and activities set by using the Model Mapping Editor. Similarly, BT tool can identify and show dependencies between business activities and IT applications, and also between business activities and solutions and initiatives, both IT and business-driven.

Figure 7:
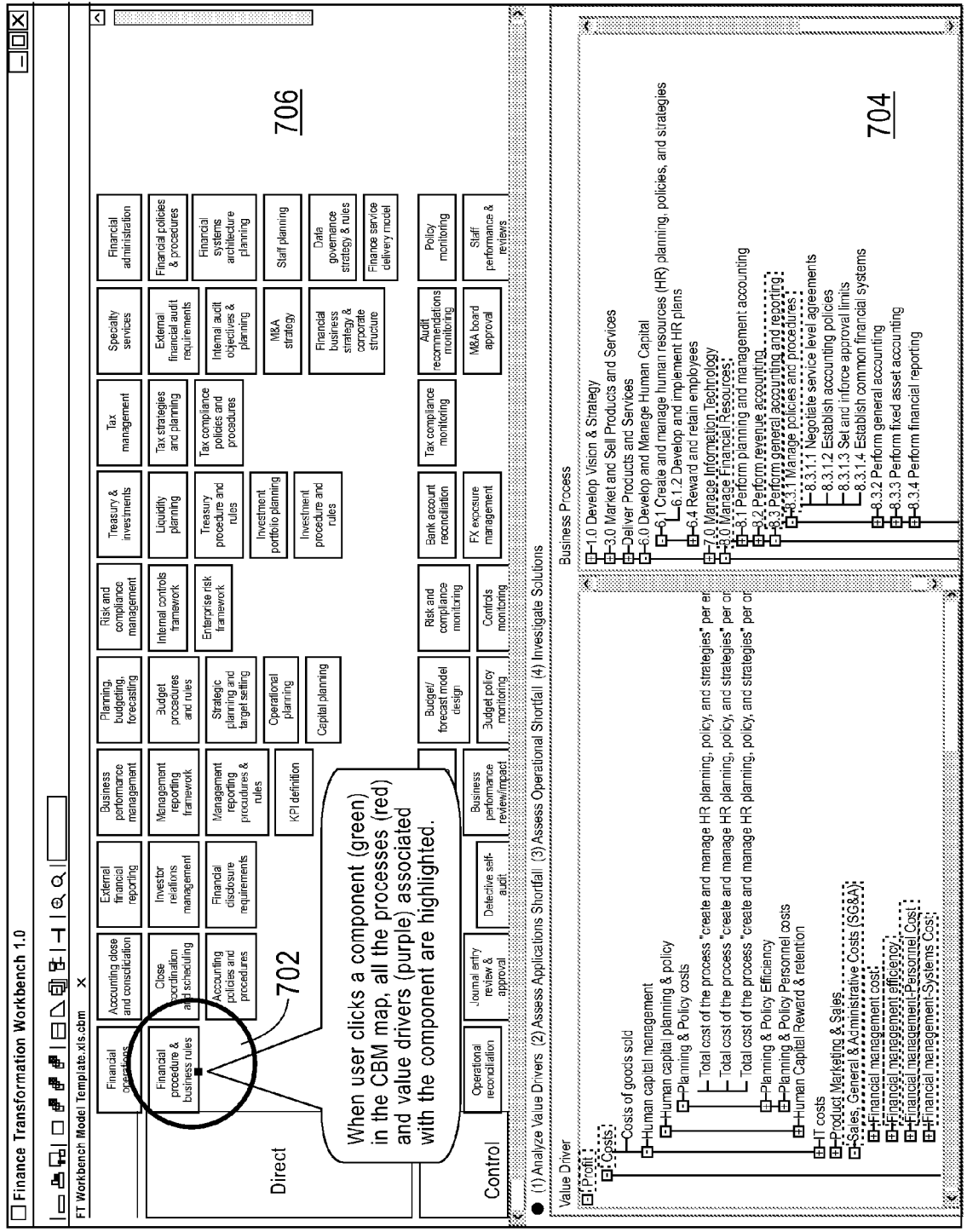
FIG. 7 illustrates a graphical user interface that enables daisy chain analysis in one embodiment of the present disclosure.

The relationships are transitive, and so it is possible to infer indirect associations between value drivers and IT applications/solutions, also between components and IT applications/solutions, and so on, through their direct linkages with entries in the business process model. Also, transitivity is used in inferring indirect relationship to ancestor entries when there is a direct relationship set for a child in a tree structured model. FIG. 7 shows an example of a user interface that includes a business component model 706 built from a template and Daisy-Chain Analysis 704 when a business component, "Financial Procedures & Business Rules" is selected, for example, by clicking on the box 702. The BT tool highlights all the business processes directly linked to the component, and also highlights all the metrics and value drivers indirectly linked to the component through those highlighted business processes. The user can see attribute values such as the as-is value and benchmark value by a mouse-over operation. To support the Daisy-Chain Analysis, the BT tool captures the basic relationship information in the Model Template file and also linkages set up with Model Mapping Editor.

The Business Component Performance Analysis allows the user to discover one or more "hot" components that are associated with one or more business strategies and/or pain points. A pain point is an area where a company is noted to be underperforming in comparison to its peers or industry leaders or expectations set by the company or combinations thereof. In the traditional CBM analysis, this step was conducted manually by the business consultants relying on knowledge and expertise in the business domain. The BT tool of the present disclosure automates the capability as visual queries, by taking metrics values into account with the analysis. The BT tool allows the user to explore the value driver tree. The Value Driver tree is a hierarchical representation of Key Performance Indicators (KPI) of business processes. At the lowest level, it provides business metrics, which are used to measure the performance of low level business activities of the Business Process Hierarchy. The Value Driver tree may also include attribute values such as one or more benchmark values and the business' current value associated with those metrics. The low level metrics are grouped to one or more higher level indicators. At the highest level of the Value Driver tree, the indicators are grouped into financial metrics of enterprises such as cost, revenue, profit, share value, etc.

Figure 8:
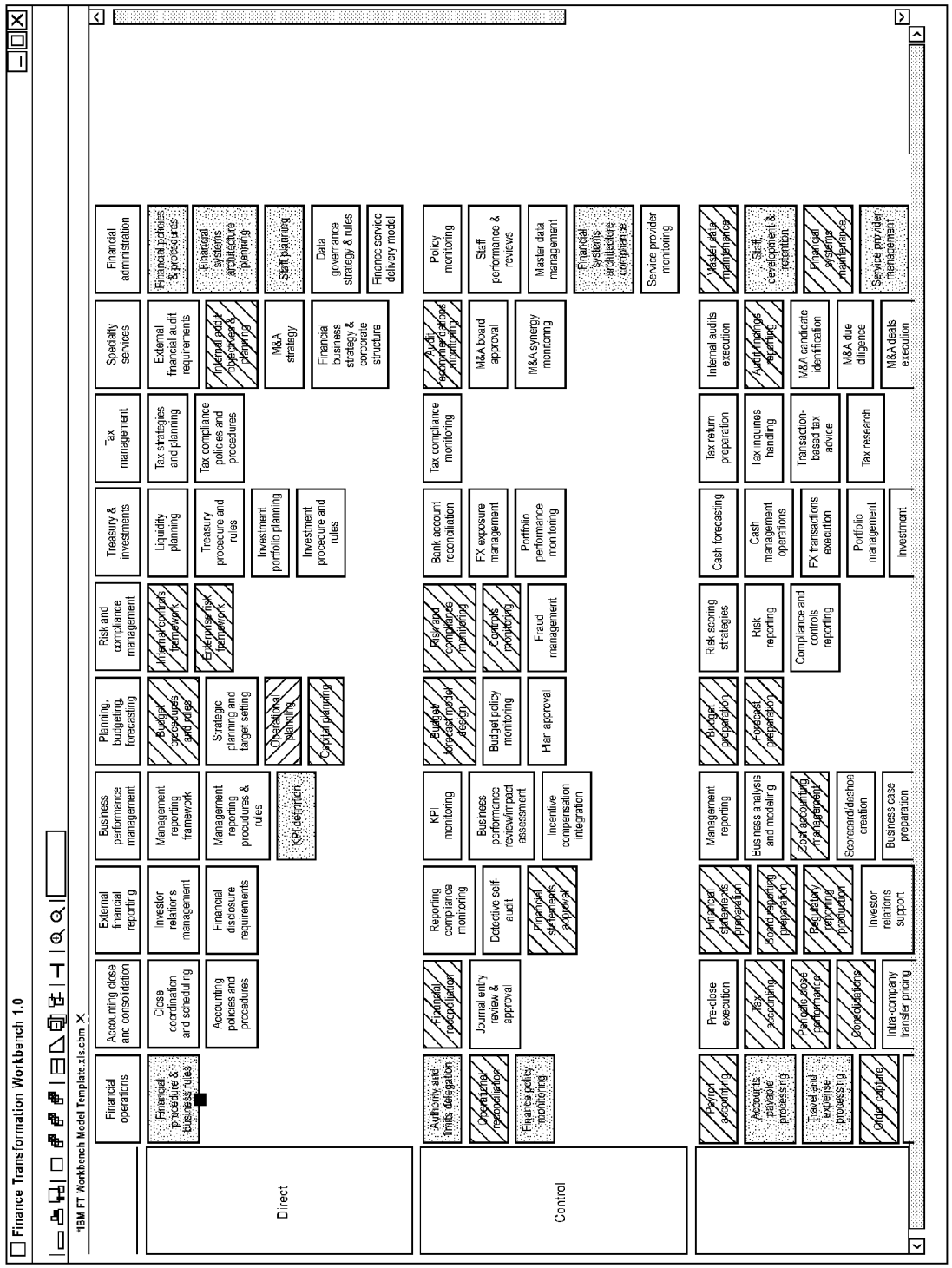
FIG. 8 illustrates a CBM map after business component performance analysis is performed.

Using the value driver tree, one or more value drivers can be identified that may be associated with a certain business strategy/pain point. The discovery of "hot" components that affect the business strategy can be accomplished. Various visualization techniques may be employed, for example, coloring the identified hot components differently to distinguish ones that affect positively or negatively to the strategy. The BT tool system compares the industry benchmark and the as-is value of the operational metrics and performance indicators associated with the components to decide on their color. FIG. 8 shows an example of a CBM map showing the result of a Business Component Performance Analysis.

An algorithm for coloring business component in the Business Component Performance Analysis is as follows: The BT tool system compares the three values—as-is (from client), benchmark, and median values of each metric associated with each business component. Benchmark and median values may be obtained from available benchmarking tools, benchmark data repositories, etc. For example, APQC provides sets of benchmark data for fee. Benchmark data may be also obtained from tools that survey and collect metrics value of a plurality of business processes from a plurality of members and/or customers. The data is then analyzed statistically. For example, the benchmark value of a metric is the 90 percentile value. The median value is the 60 percentile value, etc. If necessary, there can be more than one value like benchmark and median for comparisons. The business component is colored green, if the as-is value of each and every metric associated with this component is better than the corresponding benchmark value. The business component is colored yellow, if it has at least one metric whose as-is value is better the median value but worse then the benchmark value, and all the other metrics have as-is value, which is better than the benchmark value. The business component is colored red, if it has at least one metric whose as-is value is worse then the median value. The notion of "being better" compares differently for different metric value types: For the "Less is Better" type: A is better, if A<B. However, for the "More is Better" type: A is better, if A>B.

Depending on analysis needs, there may be many variants of the component color coding algorithms for the Business Component Performance Analysis. The following algorithms may be utilized:

AT LEAST ONE: The Business Component Performance Analysis engine identifies all the business components associated with the current value driver, and discovers ones at least one of whose associated metrics has the as-is value worse than the benchmark value; the engine colors the components red, while coloring the other components green. This algorithm is most aggressive in identifying "hot" components.

ALL: This algorithm is at the other end of the spectrum of Business Component Performance Analysis algorithms. It is most generous in identifying "hot" components. The Business Component Performance Analysis engine discovers business components all of whose associated metrics have the as-is value worse than the benchmark value; the engine colors the components red, while coloring the other components green.

MAJORITY without weights: This algorithm is in the middle of the spectrum. The Business Component Performance Analysis engine discovers business components more than half of whose associated metrics have the as-is value worse than the benchmark value; the engine colors the components red, while coloring the other components green.

MAJORITY with weights: This algorithm assumes some weight value assigned to each metric. Also, it assumes a threshold value that compared to a component's "heat" value. The heat value of a component is computed by applying the difference of as-is values and benchmark values of associated metrics and their weights. Depending on how the equation is formulated, this algorithm can provide various results. This can be a generic algorithm for the three special cases above.

In another aspect, the spectrum of colors may be used to indicate the results of the performance analysis. More colors can be added (in addition to red and green) to represent the "heat" degree ("temperature") of components. One example is the use of yellow in FIG. 8 to indicate the mediocre performance between red and green.

The Shortfall Assessment allows the user to map the existing IT infrastructure or organization structure against the "hot" components identified in the Business Component Performance Analysis. It helps in understanding of how the current IT infrastructure or organization structure, such as applications, network capabilities or certain departments, supports the business, especially, for those hot components. The analysis includes collecting the information on the current IT infrastructure or organization structure. Then the mapping of IT applications or organization structure to the components becomes, again, an execution of a simple data query to the basic model mapping. For example, as shown in FIG. 4, IT Applications may be manually mapped 406 to Business Processes during the data preparation, and the mapping information stored in the Model Template. Additionally, Business Components may be manually mapped 402 again to Business Processes, and the information also stored in the Model Template. By using this mapping information in the Model Template, the system and method of the present disclosure may discover indirect, implicit relationships between IT Application elements and Business Components. The discovery becomes the result of the IT Application Shortfall Assessment query and it is visually rendered as color-coded triangles (e.g., representing individual IT Applications) overlaid on top of associated Business Components in one embodiment. The Organization Shortfall Assessment query works in similar manner, for instance, using different mapping information, i.e., Organizations-to-Business Process mapping 408 instead of the IT Application-to-Business Process mapping 406. The Organizations may be represented by color-coded squares in the view, instead of color-coded triangles, to distinguish IT Applications and Organizations overlaid on Business Components.

BT tool visualizes the mapping on the CBM map by overlaying IT applications and/or organization structure on components. Then, the user can visually classify possible IT shortfalls into several types. Typically, four types of opportunities tend to arise. First, a gap indicates that a hot component does not have any IT/organizational support. The enterprise may want to consider an IT/organizational investment to improve the component's performance and support the intended business transformation. Second, a duplication indicates that a component is supported by multiple IT applications or multiple departments, possibly, deployed over time. The business may want to consolidate the applications to improve performance and reduce cost in communication and maintenance overhead. Third, a deficiency indicates that the current application lacks key functionality, or is poorly designed, and so incurs a project opportunity. Fourth, an over-extension indicates that a system designed to support one business component is extended beyond its core capability to support others. Different definitions for the shortfall types may apply.

Figure 9:
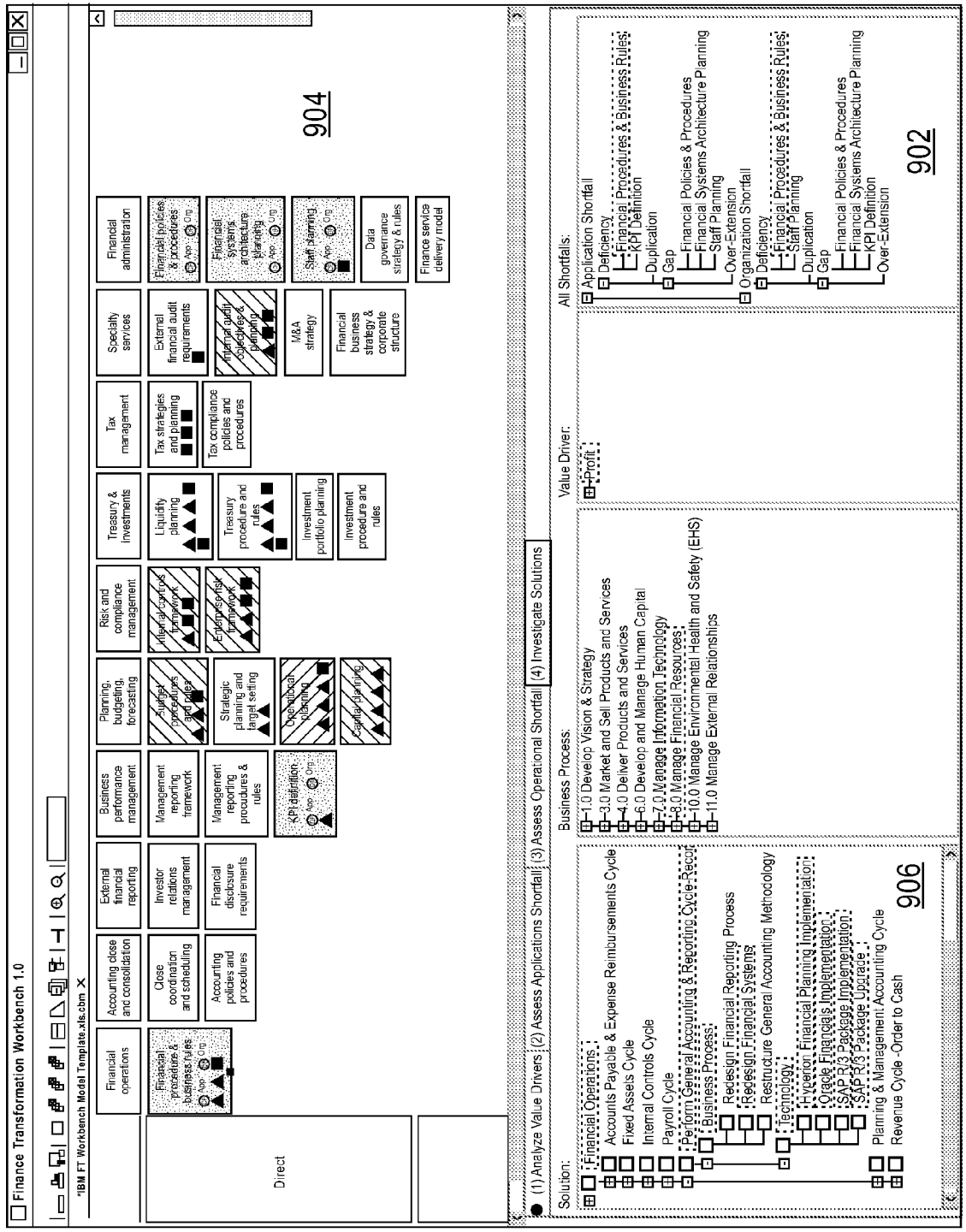
FIG. 9 illustrates a graphical user interface that shows shortfall assessment.

FIG. 9 shows a BT tool view after a shortfall assessment. Colored triangles overlaid on hot components represent IT applications of the business under analysis, while colored squares represent organizations. Other visualization codes or shapes are possible. The overlay helps the users visually categorize and label shortfalls. A user interface such as fields for populating may be provided to aid the user in labeling the observed shortfalls. For instance, the user finds a "gap" when the user sees a "hot" component (red from the heat map analysis) without any IT application (those triangles overlaid) supporting the component. The user finds a "deficiency" when the user sees a hot component with one or more application supporting it, but its performance is still not enough (red). It needs strengthening of the IT application. The user finds a "duplication" when the user sees a component having more than one applications supporting it. One may want to consolidate them to reduce the overhead cost in maintenance and communication. The user sees an "over-extension" where an IT application supports more than one components. Ideally, an application supports only one component and works independently of other components. One may want to refocus the application to only one component. The determination of shortfall types may take other information into account such as qualitative factors, which the user has knowledge of. In another embodiment, this IT shortfall discovery can be automated by using one or more pattern recognition algorithms. As the user labels the identified shortfalls to components, the labels also visually remain on the hot components. Additionally, the business components labeled having one or more shortfalls may be added to the shortfall tree 902, which is shown at the lower right-hand corner of the screen in FIG. 9.

Once IT and/or organizational shortfalls are identified and classified, one or more solution catalogs are used to identify IT transformation initiatives to address the shortfalls and support the intended business transformation. The BT tool allows the user to explore the solution space to identify one or more solutions that may address one or more shortfalls of interest. The discovery of solutions for supporting components associated with a shortfall can be automatically conducted by executing the "Daisy-Chain" queries that correlate solutions and components by using their relationships to business processes. In addition, the BT tool allows the user to manually correlate them, if desired. For example, by applying the "Daisy-Chain Analyses" of the present disclosure, one or more solutions for the Business Components having one or more shortfalls in terms of IT Applications and/or Organizations can be discovered. That is, an inference of indirect, implicit relationship between one or more Solutions and one or more Business Components having one or more shortfalls, by using explicit, direction relationships 410 between Solutions and Business Processes and relationships 402 between Business Components and Business Processes may be used. An inference engine may be provided as part of the daisy chain analyses to automatically infer the indirect relationships to discover the solutions for the Components with Shortfalls.

For example, the shortfall tree 902 (and the CBM view 904) shown in FIG. 9 indicates that the "Financial Procedures & Business Rules" component has deficiencies in IT applications and organizations supporting it. Selecting the component, for example by a click on the component in the shortfall tree highlights all the possible solutions for the component from the solution catalog 906 shown in the lower left-hand corner of the screen. The inference of solutions and initiatives for a business component is an example of the daisy-chain analysis. By using the model mapping captured in the daisy-chain of models described above, the BT tool system identifies solutions indirectly linked to a component through their direct relationships to business processes.

Figure 1:
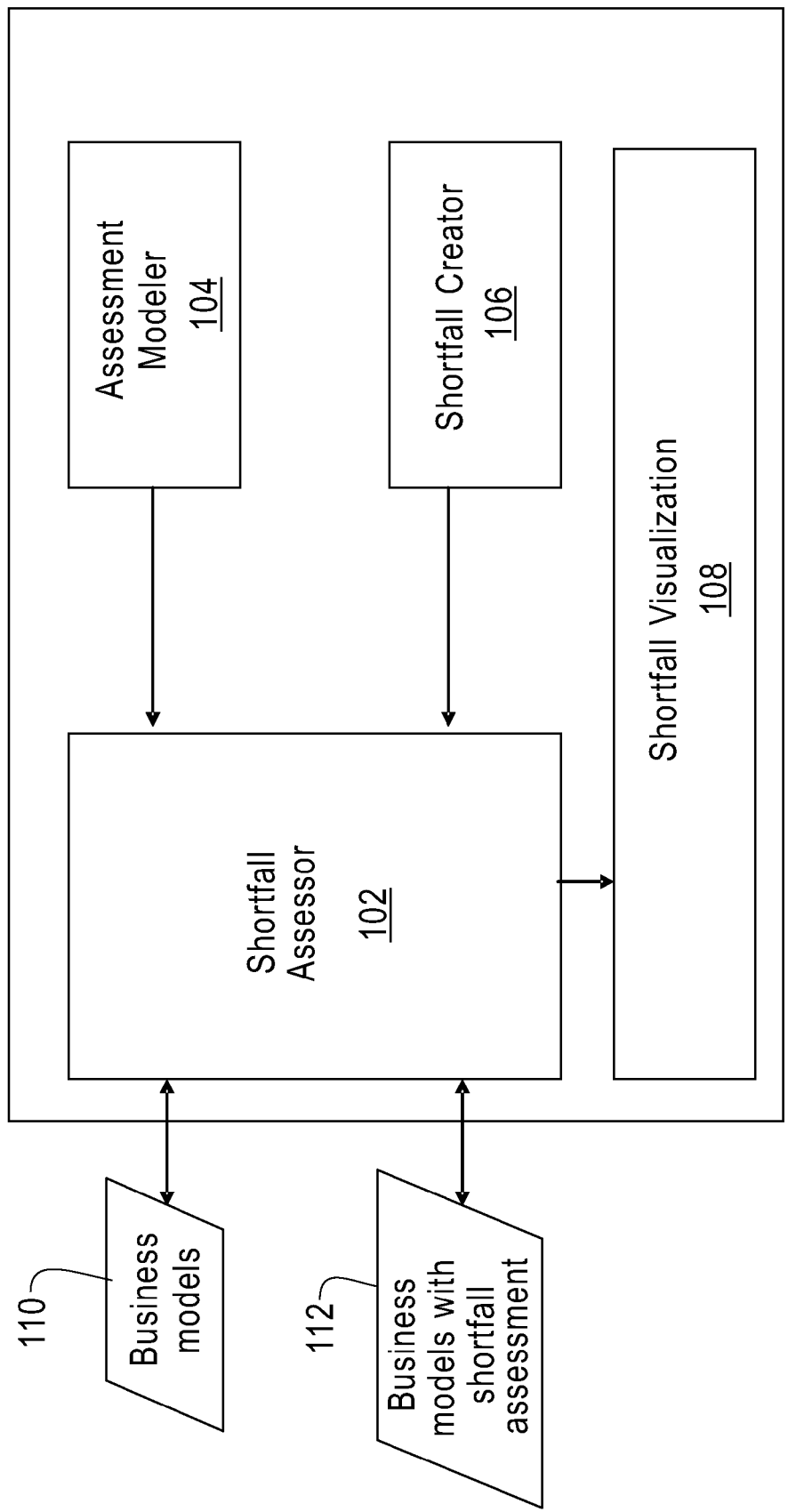
FIG. 1 is an architectural diagram illustrating components of shortfall assessment in one embodiment of the present disclosure.

FIG. 1 is an architectural diagram illustrating functional components of shortfall assessment of the present disclosure in one embodiment. The various modules shown in FIG. 1 are logical or functional components illustrated as examples to explain the workings of the system of the present disclosure in one embodiment. Those modules may be implemented as computer software or hardware components. A system for determining shortfalls of one or more business components by multiple dimensions for business transformation in one embodiment may comprise a computer-implemented module, apparatus or like that automates shortfall assessment as visual queries of data associated with models that represent an enterprise, business or like. Dimensions of shortfall assessment may include but are not limited to IT application, resources such as human and/or physical assets, organization, operation, project initiatives, technology, and like. The system may also include a computer-implemented module, apparatus or like that performs analysis of multi-dimensional shortfalls. Analysis may include determining shortfalls by one or more dimensions, different dimensions rendered in a single view. The analysis may also include filtering shortfalls of different dimensions by dimension. A user interface widget may be provided to allow users to filter as desired. The analysis may also include aggregating shortfalls on a component of different dimensions into a single shortfall. The system for determining shortfalls of the present disclosure in one embodiment may also include a computer-implemented module or apparatus or like that augments quantitative measures with shortfalls. Quantitative measures may be provided that indicate the intensity of shortfall in terms of metrics, qualitative annotations can be added to explain the reasoning for the shortfall, and color-coded visualization may be provided to help understand the combined qualitative and quantitative measures of shortfalls.

Referring to FIG. 1, in shortfall assessor 102, a user configures the dimensions in the shortfall analysis, such as IT application, resources (human and physical assets), organization, operation, project, technology, etc. The assessment modeler 104 uses the shortfall dimensions to query the business model contents 110, evaluate the shortfall according to the shortfall model and algorithms configured by shortfall creator 106, and saves and/or update shortfall assessment results to the business contents at 112. The shortfall creator 106 constructs different shortfall types, models and algorithms. For example, for IT application, the shortfalls may be categorized to three types as gap, deficiency and duplication. Gap exists if a business component is not associated with any IT system (or organizational department), deficiency exists if a business component is associated with one or more IT systems (or organizational departments) and the performance of the business component lags behind a certain level such as a benchmark performance. Duplication exists if a business component is associated with more than one IT systems (or organizational departments). For operation, the system and method of the present disclosure in one embodiment may measure the shortfall by operation metrics by using algorithms such as AT LEAST ONE, ALL, MAJORITY without weights, and MAJORITY with weights as described above.

A shortfall visualization module 108 visualizes the shortfall assessment result, for example, using different shapes for different dimensions, and different color-coding for different shortfall levels in the same component map, or presenting different shortfall dimensions in different component maps. The visualization module 108 may include a configurable mapping template having shortfall types and/or levels with the visualized element (shape, color, size, etc.). The visualization module 108 may also include layout configurable parameters. Business models 110 provide the contents for shortfall assessor as shown in FIG. 2. Business models 110 may include business component, business process, application, organization, project, resource, etc. and their relationships.

Figure 10:
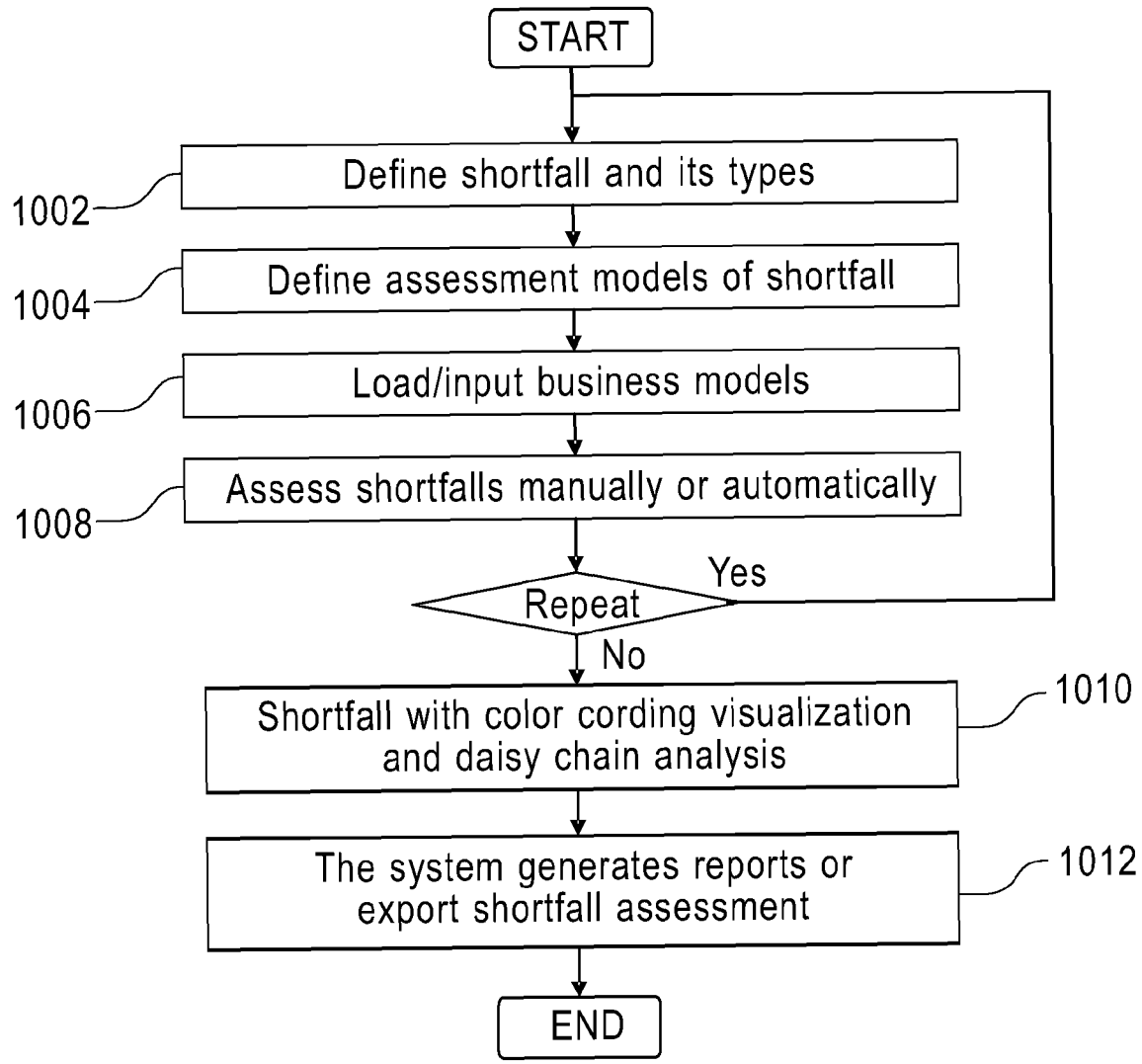
FIG. 10 is a flow diagram illustrating shortfall assessment method in one embodiment of the present disclosure.

FIG. 10 is a flow diagram illustrating shortfall assessment method in one embodiment of the present disclosure. At 1002, shortfall and its types are defined. For example, application shortfall may include gaps, duplication, over-extension and deficiency. A gap is identified if a business component is not associated with any IT system (or organizational department), deficiency if a business component is associated with one or more IT systems (or organizational departments) and the performance of the business component lag behind a certain level such as a benchmark performance. Duplication occurs if a business component is associated with more than one IT systems (or organizational departments or like, etc). Application shortfall can be determined or calculated based on daisy chain model as shown in FIG. 4. The applications related to a given business components are those applications related with the business processes which are linked with the given business component. Step 1002 defines the kind or type of shortfall or shortfalls to be evaluated. The type of shortfall defined at step 1002 may guide the business model content loading. At 1004, one or more assessment models of shortfall are defined. For example, for operation dimension, the system and method of the present disclosure in one embodiment may measure the shortfall by operation metrics by using algorithms such as AT LEAST ONE, ALL, MAJORITY without weights, and MAJORITY with weights as described above. Step 1004 provides evaluation criteria. After defining the shortfall and its types at step 1002 and defining assessment models at step 1004, one or more business models are loaded at 1006. The business models loaded in step 1006 provides context for the shortfall evaluation. At 1008, shortfalls may be assessed manually or automatically based on the assessment model, for instance, as described with reference to the shortfall assessor module 102 shown in FIG. 1. The steps at 1002, 1004, 1006 and 1008 may be repeated to create and assess other kinds of shortfalls. At 1010, all the shortfalls can be visualized, for example, by color-coding and by inputting to the daisy chain analysis. At 1012, the shortfall assessment result can be generated into report or exported to other systems, such as daisy chain analysis system or module.

Figure 11:
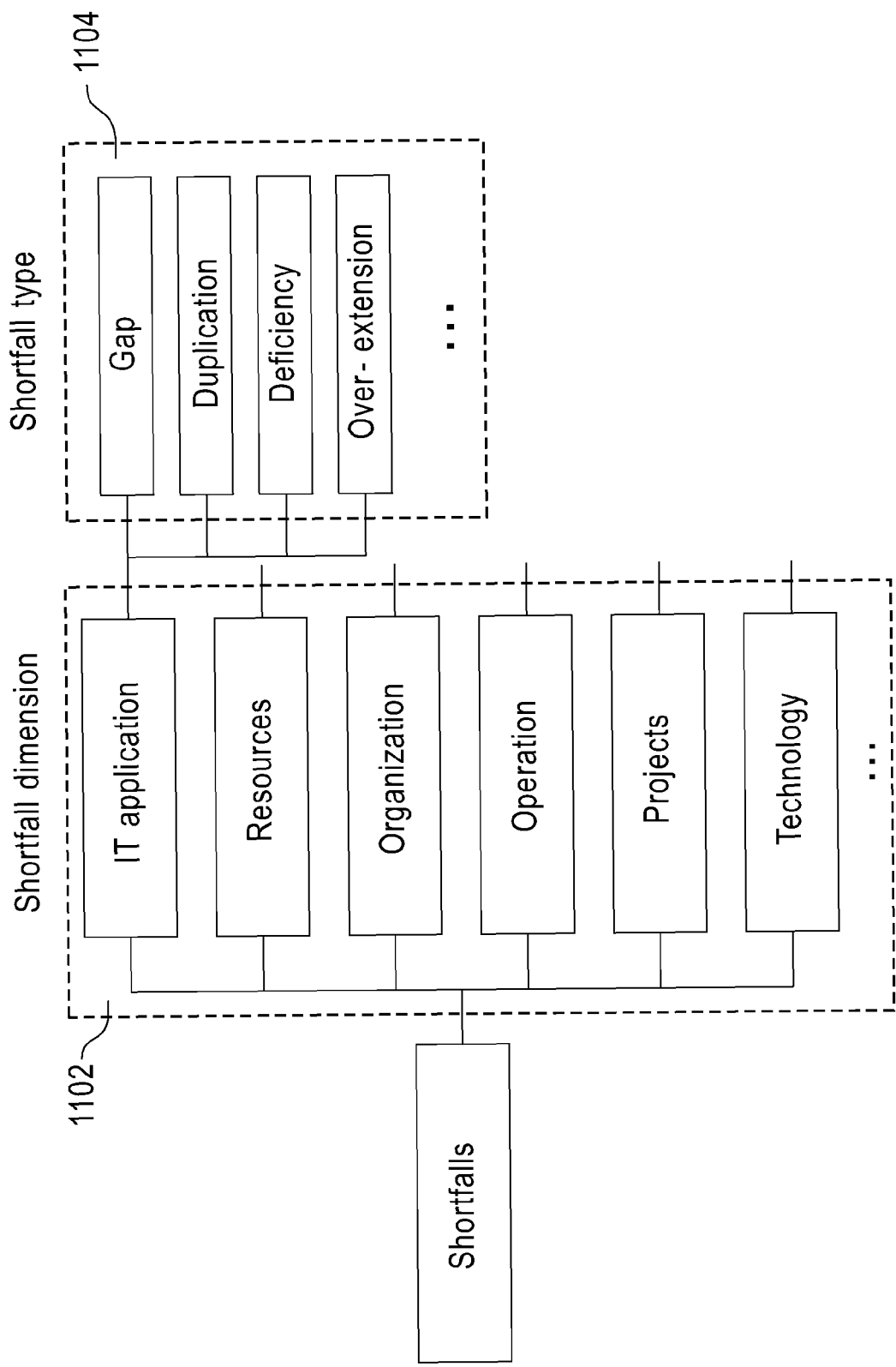
FIG. 11 is a diagram illustrating shortfalls in one embodiment of the present disclosure.

FIG. 11 is a diagram illustrating shortfalls in one embodiment of the present disclosure. Dimensions of shortfall assessment 1102 may include IT application, resource (human and physical assets), organization, operation, project initiatives, technology, etc. For each shortfall dimension, the type of shortfall 1104 can be defined. For example there may be four types of shortfall—gaps, duplication, over-extension and deficiency.

FIG. 12 is a diagram illustrating an example of shortfall assessment model in one embodiment of the present disclosure. It may be a weighted scoring model comprising the shortfall dimension specified in 102 (FIG. 1) under the algorithm specified in 106 (FIG. 1). The model may be created by users. For the shortfall assessment, the user can label the shortfalls manually or using a model shown in FIG. 12. In one aspect, a shortfall assessment model may comprise description of shortfall assessment by one or more assessment criteria 1202, including, for example, criteria, weight and description. This model translates shortfall assessment into one or more criteria, and prioritizes those criteria to determine their weighted importance. Next, the user may determine the impact of object (for example, IT application) on the criteria. As an example, a scale of one to five is used to indicate a score shown at 1204. The score 1204 represents the evaluation of a selected object, in this example, the IT application on the criteria. Taking an IT application and a risk as the criteria as examples, the user may select one score to indicate the IT application's risk. For example, five (Very High) might mean that that particular IT application has been used in a comparable organization and the benefits could be transferred easily, three (Moderate) could mean that the IT application is difficult to implement because it would require changing processes; one (Very Low) might mean the solution has not yet worked anywhere else. Following the scoring, a user associates the score with shortfalls. For example, assuming the total score is five, if a component has the assessment result below 3, the component is labeled as a deficiency shortfall.

As described above, the system and method of the present disclosure provides a map that a user can easily visualize, assess and/or categorize shortfalls of one or more business components, for instance, as the following types:

Gaps—no system exists, the system lacks key functionality, or is poorly designed and/or uses the wrong technology for a specific component.

Duplication—multiple systems compete for the same component, typically adding unnecessary complexity and/or cost to development, maintenance and production.

Over-Extension—a system designed to support one component is extended to help support others, for which it may not have appropriate capabilities. Furthermore, as a system gets more diverse and/or extensive, the cost and/or complexity of its operation increase exponentially.

Deficiency—current application or like lacks key functionality or is poorly designed.

Figure 13:
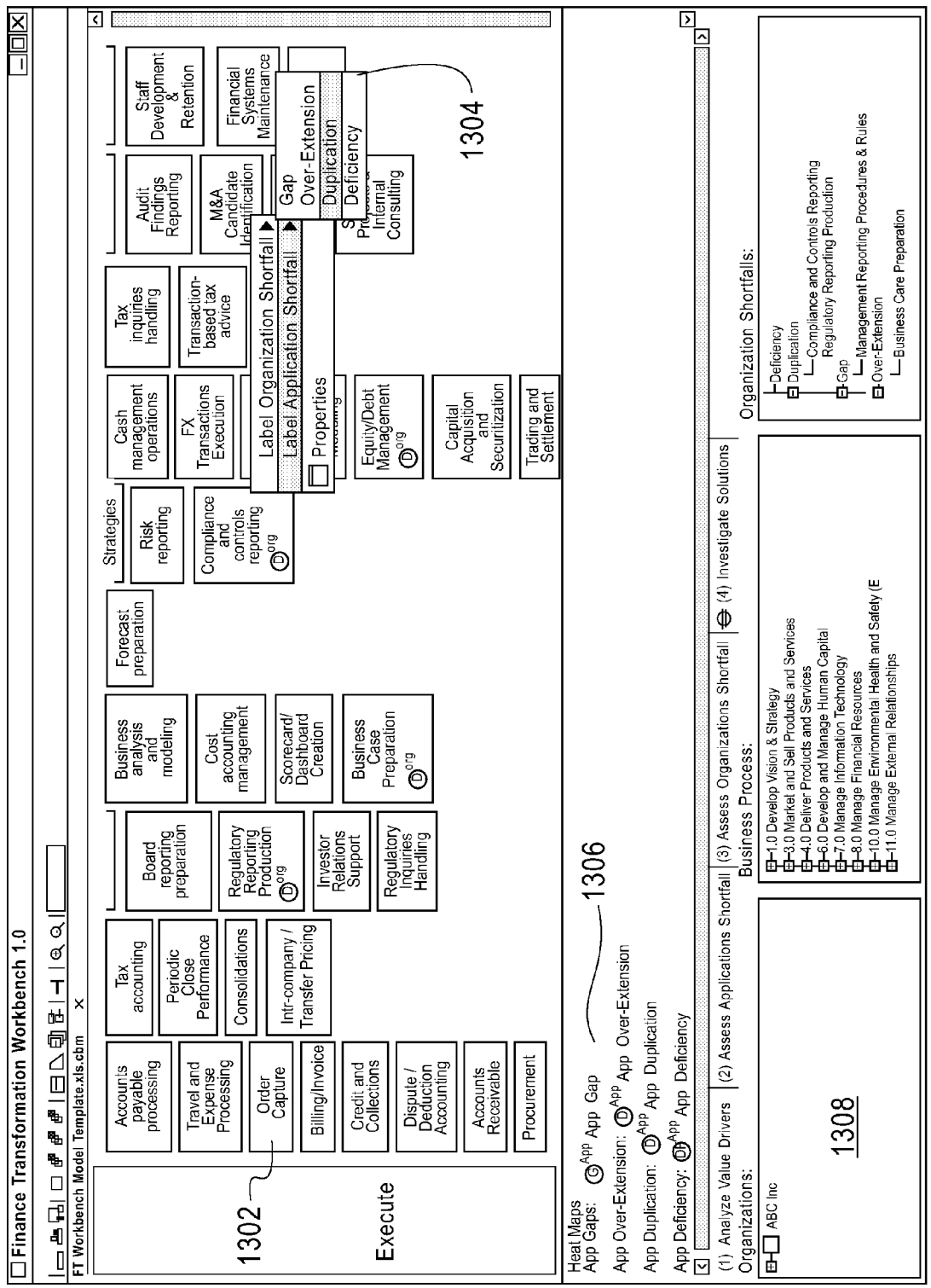
FIG. 13 is a diagram illustrating an example of color coding shortfalls in one embodiment of the present disclosure.

FIG. 13 is a diagram illustrating an example of color coding shortfalls in one embodiment of the present disclosure. 1302 shows color coding shortfall in CBM map. At 1304, a user can easily define or label the component's shortfall, for instance, using a widget provided on the user interface. 1306 shows the legend of heat map with color coded shortfall. The shortfall assessment can be used for daisy chain analysis as shown in 1408.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for determining one or more shortfalls of one or more business components by multiple dimensions for business transformation, comprising:

defining a plurality of shortfall types associated with a plurality of business components;

defining a plurality of dimensions of the plurality of business components;

constructing a shortfall assessment model for the plurality of dimensions;

loading a business model associated with the plurality of business components;

computing, by a processor, shortfall assessment by performing a daisy chain analysis using the shortfall assessment model and the business model for said plurality of shortfalls and associated shortfall types, the daisy chain analysis providing an automatic visual query for understanding correlations and dependencies directly or indi rectly among business components, value drivers and business processes; and presenting the shortfall assessment using visualization, wherein the visualization includes the plurality of dimensions represented by respective different visual codes overlaid on a business component of business component view, the plurality of dimensions including at least IT application and organization dimensions, wherein a user interface widget is provided on the visualization to enable a user to label the business component with identified shortfall type and wherein the visualization further includes a shortfall tree view wherein the user labeled business component is added to the shortfall tree view on the visualization, wherein shortfalls of different dimensions are rendered in a single view.

2. The method of claim 1, wherein said presenting step includes rendering visualization of shortfalls of the plurality of dimensions including IT application, resources, organization, operation, project initiatives, and technology in a single view.

3. The method of claim 1, wherein the dimensions include IT application, resources, organization, operation, project initiatives, technology, or combinations thereof.

4. The method of claim 1, wherein the shortfall types include a gap shortfall.

5. The method of claim 1, wherein the shortfall types include a deficiency shortfall.

6. The method of claim 1, wherein the shortfall types include a duplication shortfall.

7. The method of claim 1, wherein the shortfall types include an over-extension shortfall.

8. The method of claim 1, wherein the visualization includes color coding the plurality of shortfall types.

9. The method of claim 1, wherein the visualization includes presenting the plurality of dimensions using a plurality of different geometric shapes.

10. The method of claim 1, wherein the shortfall assessment model uses operation metrics for determining a shortfall.

11. The method of claim 1, wherein the shortfall assessment model uses a predetermined algorithm for determining a shortfall.

12. The method of claim 1, further including generating a report of said computed shortfall assessment.

13. The method of claim 1, further including allowing a user to label the visualization.

14. The method of claim 1, wherein said shortfall types and dimensions are defined based on a user configuration.

15. A system for determining one or more shortfalls of one or more business components by multiple dimensions for business transformation, comprising:

a processor;

a shortfall assessor module operable to define a plurality of shortfall types associated with a plurality of business components, the shortfall assessor module further operable to define a plurality of dimensions of the plurality of business components, the shortfall assessor module further operable to load a business model associated with the plurality of business components;

an assessment modeler module operable to construct a shortfall assessment model for the plurality of dimensions;

a shortfall creator module, operable to execute on the processor and further operable to compute shortfall assessment by performing a daisy chain analysis using the shortfall assessment model and a business model for said plurality of shortfalls and associated shortfall types, the daisy chain analysis providing an automatic visual query for understanding correlations and dependencies directly or indirectly among business components, value drivers and business processes; and a shortfall visualization module operable to present the shortfall assessment using visualization, wherein the visualization includes the plurality of dimensions represented by different visual codes overlaid on a business component of business component view, the plurality of dimensions including at least IT application and organization dimensions, wherein a user interface widget is provided on the visualization to enable a user to label the business component with identified shortfall type and wherein the visualization further includes a shortfall tree view wherein the user labeled business component is added to the shortfall tree view on the visualization, wherein shortfalls of different dimensions are rendered in a single view.

16. The system of claim 15, wherein the shortfall visualization module renders visualization of shortfalls of the plurality of dimensions including IT application, resources, organization, operation, project initiatives, and technology in a single view.

17. The system of claim 15, wherein the dimensions include IT application, resources, organization, operation, project initiatives, technology, or combinations thereof.

18. The system of claim 15, wherein the shortfall types include a gap shortfall.

19. The system of claim 15, wherein the shortfall types include a deficiency shortfall.

20. The system of claim 15, wherein the shortfall types include a duplication shortfall.

21. The system of claim 15, wherein the shortfall types include an over-extension shortfall.

22. The system of claim 15, wherein the visualization includes color coding the plurality of shortfall types.

23. The system of claim 15, wherein the visualization includes presenting the plurality of dimensions using a plurality of different geometric shapes.

24. The system of claim 15, wherein the shortfall assessment model uses operation metrics for determining a shortfall.

25. The system of claim 15, wherein the shortfall assessment model uses a predetermined algorithm for determining a shortfall.

26. The system of claim 15, wherein the system generates a report of said computed shortfall assessment.

27. The system of claim 15, wherein the system allows a user to label the visualization.

28. The system of claim 15, wherein said shortfall types and dimensions are defined based on a user configuration.

29. A program storage device readable by a machine, tangibly embodying a program of instructions executable by the machine to perform a method of determining one or more shortfalls of one or more business components by multiple dimensions for business transformation, comprising:

defining a plurality of shortfall types associated with a plurality of business components;

defining a plurality of dimensions of the plurality of business components;

constructing a shortfall assessment model for the plurality of dimensions;

loading a business model associated with the plurality of business components;

computing shortfall assessment by performing a daisy chain analysis using the shortfall assessment model and the business model for said plurality of shortfalls and associated shortfall types, the daisy chain analysis providing an automatic visual query for understanding correlations and dependencies directly or indirectly among business components, value drivers and business processes; and presenting the shortfall assessment using visualization, wherein the visualization includes the plurality of dimensions represented by different visual codes overlaid on a business component of business component view, the plurality of dimensions including at least IT application and organization dimensions, wherein a user interface widget is provided on the visualization to enable a user to label the business component with identified shortfall type and wherein the visualization further includes a shortfall tree view wherein the user labeled business component is added to the shortfall tree view on the visualization, wherein shortfalls of different dimensions are rendered in a single view.

30. The program storage device of claim 29, wherein said presenting step includes rendering visualization of shortfalls of the plurality of dimensions including IT application, resources, organization, operation, project initiatives, and technology in a single view.

31. The program storage device of claim 29, wherein the dimensions include IT application, resources, organization, operation, project initiatives, technology, or combinations thereof.

32. The program storage device of claim 29, wherein the shortfall types include a gap shortfall.

33. The program storage device of claim 29, wherein the shortfall types include a deficiency shortfall.

34. The program storage device of claim 29, wherein the shortfall types include a duplication shortfall.

35. The program storage device of claim 29, wherein the shortfall types include an over-extension shortfall.

* * * * *